(12) United States Patent
Kawase et al.

(10) Patent No.: US 12,437,544 B2
(45) Date of Patent: Oct. 7, 2025

(54) CREDIT-BASED BODY SCAN APPARATUS, METHOD, AND STORAGE MEDIUM

(71) Applicant: NEC Corporation, Tokyo (JP)

(72) Inventors: Nobuaki Kawase, Tokyo (JP); Kunio Fudemoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/389,235

(22) Filed: Nov. 14, 2023

(65) Prior Publication Data
US 2024/0087325 A1    Mar. 14, 2024

Related U.S. Application Data

(63) Continuation of application No. 17/895,708, filed on Aug. 25, 2022, now Pat. No. 11,854,268, which is a
(Continued)

(51) Int. Cl.
| | | |
|---|---|---|
| G06V 20/52 | (2022.01) | |
| G06F 3/14 | (2006.01) | |
| G06K 19/07 | (2006.01) | |
| G06Q 40/03 | (2023.01) | |
| G06V 10/44 | (2022.01) | |
| G06V 10/77 | (2022.01) | |
| G06V 40/16 | (2022.01) | |

(52) U.S. Cl.
CPC ............ *G06V 20/52* (2022.01); *G06F 3/14* (2013.01); *G06Q 40/03* (2023.01); *G06V 10/44* (2022.01); *G06V 10/77* (2022.01); *G06V 40/172* (2022.01); *G06K 19/0723* (2013.01); *G06V 40/168* (2022.01)

(58) Field of Classification Search
CPC .. G06V 2201/05; G06V 20/52; G06V 40/172; G06V 40/168; G06V 10/44; G06V 10/77; G06F 21/32; G06F 3/14; G06F 3/1423; G06K 19/0723; G06Q 10/08; G06Q 40/03; G06Q 50/26; G06Q 50/265; G06Q 50/40
USPC .......................................................... 382/118
See application file for complete search history.

(56) References Cited

U.S. PATENT DOCUMENTS 10,366,293 B1 * 7/2019 Faviero ................. G06N 3/08
11,069,017 B1 * 7/2021 Trelin ................ G06Q 50/265
(Continued)

FOREIGN PATENT DOCUMENTS

JP    2013-023363 A    2/2013
JP    2017-537399 A    12/2017
(Continued)

OTHER PUBLICATIONS

JP Office Action for Japanese Patent Application No. 2023-162232, mailed on Jul. 9, 2024 with English Translation.
(Continued)

*Primary Examiner* — Kenny A Cese
(74) *Attorney, Agent, or Firm* — Sughrue Mion, PLLC

(57) ABSTRACT

An information processing apparatus according to the present invention includes: a first acquisition unit that acquires biometric information of a person; a second acquisition unit that acquires identification information of the baggage possessed by the person; and a creating unit that creates link information for associating the biometric information with the identification information.

20 Claims, 18 Drawing Sheets

Related U.S. Application Data continuation of application No. PCT/JP2020/008537, filed on Feb. 28, 2020.

(56) References Cited

U.S. PATENT DOCUMENTS

| | | | | |
|---|---|---|---|---|
| 2003/0225612 | A1* | 12/2003 | DeSimone | G06Q 40/08 705/13 |
| 2006/0003346 | A1 | 1/2006 | Schlomka | G01V 8/0025 378/57 |
| 2006/0083346 | A1* | 4/2006 | Schlomka | G01V 5/226 378/57 |
| 2008/0024271 | A1* | 1/2008 | Oberman | G07C 9/257 340/5.82 |
| 2009/0322873 | A1* | 12/2009 | Reilly | G01S 7/411 348/143 |
| 2010/0234989 | A1 | 9/2010 | Baier | B64F 1/368 700/245 |
| 2010/0277312 | A1 | 11/2010 | Edic | G01V 5/0026 378/57 |
| 2016/0189096 | A1* | 6/2016 | Tang | G01V 5/223 705/332 |
| 2016/0232769 | A1 | 8/2016 | Jarvi et al. | | |
| 2017/0010384 | A1* | 1/2017 | Kreuzer | G01V 5/223 |
| 2017/0083768 | A1* | 3/2017 | Xu | G06T 7/0002 |
| 2017/0185842 | A1 | 6/2017 | Chen et al. | | |
| 2017/0236232 | A1 | 8/2017 | Morton | | |
| 2017/0301004 | A1 | 10/2017 | Chimomas | G07F 11/26 |
| 2018/0014616 | A1* | 1/2018 | Vedantam | A45C 13/42 |
| 2018/0121804 | A1* | 5/2018 | Mohamadi | G06F 16/00 |
| 2018/0173967 | A1* | 6/2018 | Chen | G06V 20/52 |
| 2019/0019019 | A1 | 1/2019 | Nishikawa | G06T 1/0007 |
| 2019/0180398 | A1* | 6/2019 | Chen | G06Q 50/265 |
| 2019/0353817 | A1 | 11/2019 | Monnier | G01V 3/105 |
| 2020/0320814 | A1* | 10/2020 | Hastings | G01V 5/20 |
| 2021/0027068 | A1 | 1/2021 | Gayatri | H04N 7/188 |
| 2021/0034865 | A1* | 2/2021 | Nord | G06V 10/809 |

FOREIGN PATENT DOCUMENTS

| | | |
|---|---|---|
| JP | 2018-005491 A | 1/2018 |
| JP | 2019-040410 A | 3/2019 |
| JP | 2019-117513 A | 7/2019 |
| JP | 2020-019583 A | 2/2020 |
| WO | 2005/055151 A1 | 6/2005 |

OTHER PUBLICATIONS

International Search Report for PCT Application No. PCT/JP2020/008537, mailed on Sep. 1, 2020.

Extended European Search Report for EP Application No. 20922384.1, dated on Mar. 14, 2023.

JP Office Action for JP Application No. 2022-503060, mailed on Jul. 11, 2023 with English Translation.

* cited by examiner

| No | ITEM NAME |
|---|---|
| 1 | TOKEN ID |
| 2 | GROUP ID |
| 3 | FEATURE AMOUNT |
| 4 | REGISTERED FACE IMAGE |
| 5 | TOKEN ISSUANCE TIME |
| 6 | TOKEN ISSUANCE DEVICE NAME |
| 7 | INVALID FLAG |
| 8 | INVALIDATED TIME |

FIG. 3

| No | ITEM NAME |
|---|---|
| 1 | PASSAGE HISTORY ID |
| 2 | TOKEN ID |
| 3 | PASSAGE TIME |
| 4 | DEVICE NAME |
| 5 | OPERATION SYSTEM TYPE |
| 6 | PASSAGE TOUCH POINT |

FIG. 4

| No | ITEM NAME |
|---|---|
| 1 | TOKEN ID |
| 2 | PASSENGER NAME |
| 3 | RESERVATION NUMBER |
| 4 | ORIGIN |
| 5 | DESTINATION |
| 6 | AIRLINE CODE |
| 7 | FLIGHT NUMBER |
| 8 | DATE OF FLIGHT |
| 9 | SEAT NUMBER |
| 10 | NATIONALITY |
| 11 | PASSPORT NUMBER |
| 12 | FAMILY NAME |
| 13 | FIRST NAME |
| 14 | DATE OF BIRTH |
| 15 | GENDER |
| 16 | MEMBERSHIP CATEGORY |
| 17 | WITH OR WITHOUT ACCOMPANYING PERSON |
| 18 | TRAVEL HISTORY |
| 19 | SECURITY INSPECTION HISTORY |

| No | ITEM NAME |
|---|---|
| 1 | TARGET PERSON ID |
| 2 | CAPTURED FACE IMAGE |
| 3 | TOKEN ID |
| 4 | TRAY ID |
| 5 | CAPTURING TIME |
| 6 | BAGGAGE INSPECTION STATUS |
| 7 | BAGGAGE INSPECTION RESULT |
| 8 | BODY INSPECTION STATUS |
| 9 | BODY INSPECTION RESULT |
| 10 | BAGGAGE STORAGE LOCATION |
| 11 | DELIVERY STATUS |
| 12 | PASSPORT NUMBER |
| 13 | PERSON ATTRIBUTE INFORMATION |

CREDIT-BASED BODY SCAN APPARATUS, METHOD, AND STORAGE MEDIUM

CROSS-REFERENCE TO RELATED APPLICATIONS

This application is a Continuation of U.S. patent application Ser. No. 17/895,708 filed on Aug. 25, 2022, which is a continuation of International Application No. PCT/JP2020/008537, filed Feb. 28, 2022. The entire contents of the above-referenced application are expressly incorporated herein by reference.

TECHNICAL FIELD

The present invention relates to an information processing apparatus, an information processing method, and a storage medium.

BACKGROUND ART

Japanese Patent Application Laid-open No. 2013-23363 discloses a baggage management system in which a user who is scheduled to board an aircraft attaches an RFID tag recording boarding reservation information and baggage information to a baggage and then deposits the baggage in a carrying robot.

SUMMARY

In the baggage management system illustrated in Japanese Patent Application Laid-open No. 2013-23363, it is necessary to perform data writing and reading process to a storage medium when a baggage is checked and transported. Therefore, there is a need for a method for easily registering and managing the relationship between the baggage and its owner without using a storage medium such as an RFID tag.

The present invention intends to provide an information processing apparatus, an information processing method, and a storage medium capable of easily registering and managing a relationship between the baggage and its owner.

According to one aspect of the present invention, there is provided an information processing apparatus including: a first acquisition unit that acquires biometric information of a person; a second acquisition unit that acquires identification information of the baggage possessed by the person; and a creating unit that creates link information for associating the biometric information with the identification information.

According to another aspect of the present invention, there is provided an information processing method including: acquiring biometric information of a person; acquiring identification information of the baggage possessed by the person; and creating link information for associating the biometric information with the identification information.

According to yet another aspect of the present invention, there is provided a storage medium storing a program that causes a computer to perform: acquiring biometric information of a person; acquiring identification information of the baggage possessed by the person; and creating link information for associating the biometric information with the identification information.

BRIEF DESCRIPTION OF THE DRAWINGS

FIG. 3 is a diagram illustrating an example of information stored in a passage history information database according to the first example embodiment.

FIG. 4 is a diagram illustrating an example of information stored in an operation information database according to the first example embodiment.

EXAMPLE EMBODIMENT

Exemplary example embodiments of the present invention will be described below with reference to the drawings. Throughout the drawings, the same elements or corresponding elements are labeled with the same references, and the description thereof may be omitted or simplified.

First Example Embodiment

Figures 1, 2:
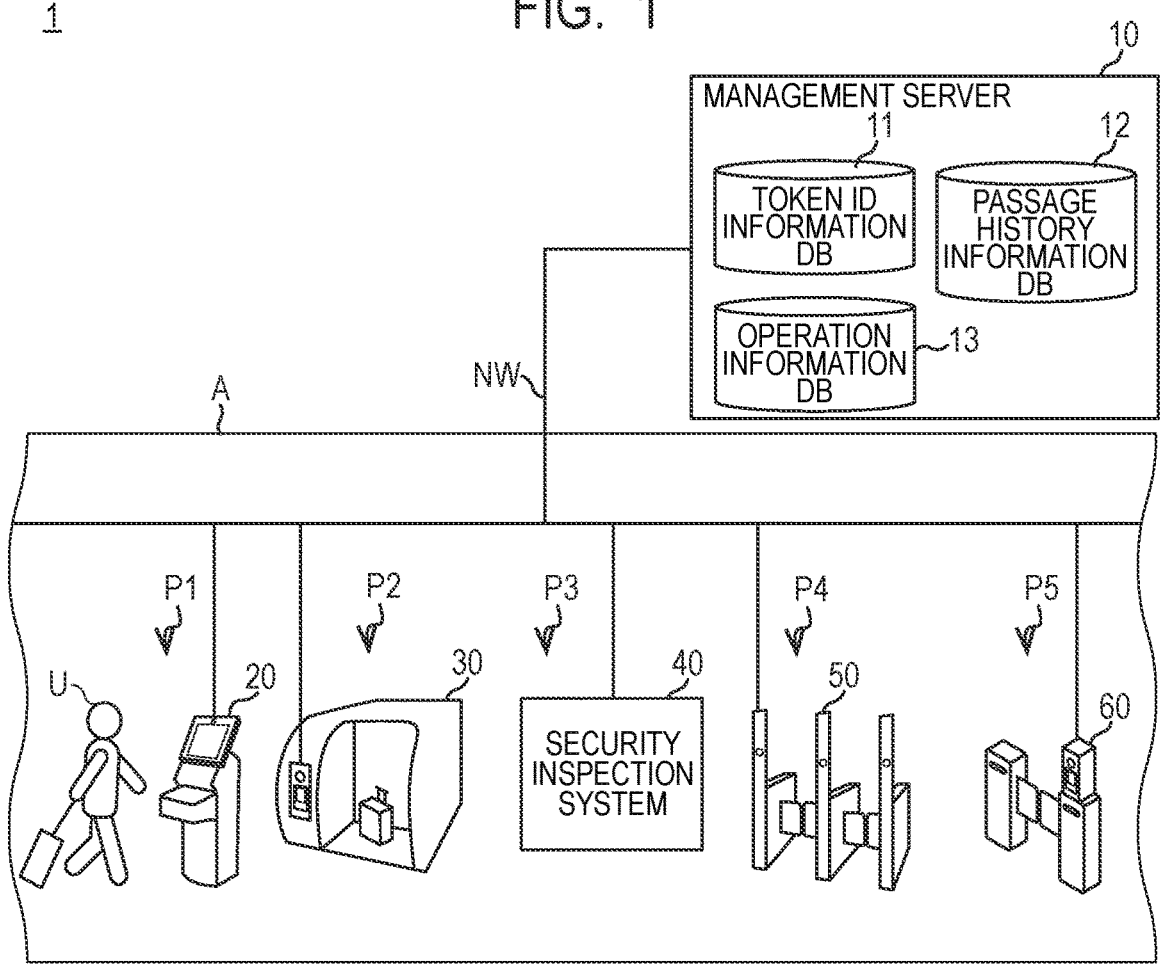
FIG. 1 is a block diagram illustrating an example of the overall configuration of an information processing system according to a first example embodiment.
FIG. 2 is a diagram illustrating an example of information stored in a token ID information database according to the first example embodiment.

FIG. 1 is a block diagram illustrating an example of the overall configuration of an information processing system 1 according to the present example embodiment. The information processing system 1 is a computer system that supports an operation concerning a series of inspection procedures to be performed for a user (passenger) U using an airport A. The information processing system 1 is operated, by a public institution such as an immigration control bureau for entry and departure or by a trustee entrusted with the operation from such an institution, for example.

The information processing system 1 of the present example embodiment includes a management server 10, a check-in terminal 20, an automatic baggage deposition device 30, a security inspection system 40, an automated gate apparatus 50, and a boarding gate apparatus 60. The management server 10 and other devices are connected to each other via a network NW. The network NW is formed of a local area network (LAN) including a local communication network of the airport A, a wide area network (WAN), a mobile communication network, and the like. The connection scheme may be a wireless scheme without being limited to a wired scheme.

FIG. 1 only illustrates a terminal device (operation terminal) used for procedures at departure from the airport A for simplified illustration. Inspection procedures at departure from a country at Airport A are sequentially performed at five touch points P1 to P5 using facial recognition technology. Details of the respective devices and the touch points P1 to P5 will be described later.

The management server 10 is a server computer for managing an operation related to the inspection procedure when the user U enters or leaves the country. The management server 10 is provided in a facility of, for example, an airport company or an airline company which runs the airport A. The management server 10 may be a cloud server instead of a server installed in a facility where an operation is actually provided. Further, the management server 10 is not necessarily required to be a single server but may be formed as a server group including a plurality of servers.

As illustrated in FIG. 1, the management server 10 includes a token ID information DB 11, a passage history information DB 12, and an operation information DB 13. However, the databases included in the management server 10 are not limited to these databases. The data items stored in each database are not limited to the following examples.

FIG. 2 is a diagram illustrating an example of information stored in the token ID information DB 11. The token ID information DB 11 has a token ID, a group ID, a registered face image, a feature amount, a token issuance time, a token issuance device name, an invalid flag, and an invalidated time as data items. The token ID is an identifier that uniquely identifies the ID information.

The token ID in the present example embodiment is temporarily issued on the condition that a matching result between the captured face image of the user U holding the passport at the touch point P1 and the passport face image read from the passport is successful. When the user U finishes the procedure at the last touch point (boarding gate), the token ID is invalidated. That is, the token ID is not a permanently used identifier but a one-time ID having an effective period (life cycle).

The group ID is an identifier for grouping the ID information. The registered face image is a face image registered with respect to the user U. The feature amount is a value extracted from biometric information (registered face image). The term of biometric information in the present example embodiment indicates a face image and a feature amount extracted from the face image, but the biometric information is not limited to the face image and the face feature amount. That is, an iris image, a fingerprint image, a palm print image, an auricle image, or the like may be used as the biometric information of the user U to perform biometric authentication.

The token issuance time is the time when the management server 10 issues a token ID. The token issuance device name is a name of a device from which a registered face image that triggers issuance of a token ID is acquired. The invalid flag is flag information indicating whether or not the token ID is currently valid. Once a token ID is issued, the invalid flag in the present example embodiment becomes a value indicating that the token ID is valid. Further, once a predetermined condition is satisfied, the invalid flag is updated to a value indicating that the token ID is invalid. The invalidated time is a timestamp when the invalid flag is disabled.

FIG. 3 is a diagram illustrating an example of information stored in the passage history information DB 12. The passage history information DB 12 includes a passage history ID, a token ID, a passage time, a device name, an operation system type, and a passage touch point as data items. The passage history ID is an identifier that uniquely identifies passage history information. The passage time is a timestamp when a passenger passes through the touch. The device name is a machine name of a terminal used in procedures at the touch point. The operation system type is a type of the operation system to which a terminal belongs. The passing touch point is the touch point which the user U has passed through. Note that the management server 10 can extract the passage history information on a token ID basis to recognize up to which touch point the user U completed the procedure.

FIG. 4 is a diagram illustrating an example of information stored in the operation information DB 13. The operation information DB 13 has a token ID, a passenger name, a reservation number, an origin, a destination, an airline code, a flight number, date of flight, a seat number, a nationality, a passport number, a family name, a first name, date of birth, a gender, a membership category, with or without accompanying person, a travel history, and a security inspection history as data items.

The reservation number is an identifier that uniquely identifies boarding reservation information. The airline code is an identifier that uniquely identifies the airline. The boarding reservation information included in the operation information includes a passenger name, a reservation number, a departure place, a destination, an airline code, a flight number, a service date, a seat number, a nationality, a passport number, a family name, a first name, a date of birth, a gender, etc. The boarding reservation information can be acquired from a storage medium such as a passport and a boarding pass. Boarding reservation information can also be acquired from airline reservation systems using the passport number or reservation number as a key. The boarding reservation information acquired from the storage medium or the reservation system is stored as operation information in the operation information DB 13.

The membership category is a category of the membership of the airline company. The with or without accompanying person indicates the presence or absence of a person (supported person), such as an infant or a young child, who is to board the aircraft with the support of the user U. The person whose accompanying person is recorded is a person such as parents, guardians, or caregivers (Hereinafter referred to as "supporter".), who supports them. The travel history is user's history information including a destination, a stopover place, date and time of travel, and the number of times of travel within the prescribed period in the past. The security inspection history is history information including inspection result, date and time, and the like of the security inspection which the User U underwent in the past travel.

The check-in terminal 20 is installed in a check-in lobby (Hereinafter referred to as "touch point P1".) in the airport A. The check-in terminal 20 is a self-service terminal by which the user U performs a check-in procedure (boarding procedure) by himself/herself. Upon completion of the check-in procedure at the touch point P1, the user U moves to a baggage deposition place or a security inspection site.

The automatic baggage deposition device 30 is installed in an area adjacent to a baggage counter (manned counter) in the airport A or in an area near the check-in terminal 20 (Hereinafter referred to as "touch point P2".). The automatic baggage deposition device 30 is a self-service terminal which is operated by the user U by himself/herself to perform a procedure of checking a baggage that is not brought into a cabin. Upon completion of the procedure, the user U moves to the security inspection site. Note that, when the user U does not deposit his/her own baggage, the procedure at the touch point P2 is omitted. In the following description, the term "baggage" indicates a baggage that the user U wishes to bring into the cabin other than baggage that the user U has checked at the touch point P2.

Figure 5:
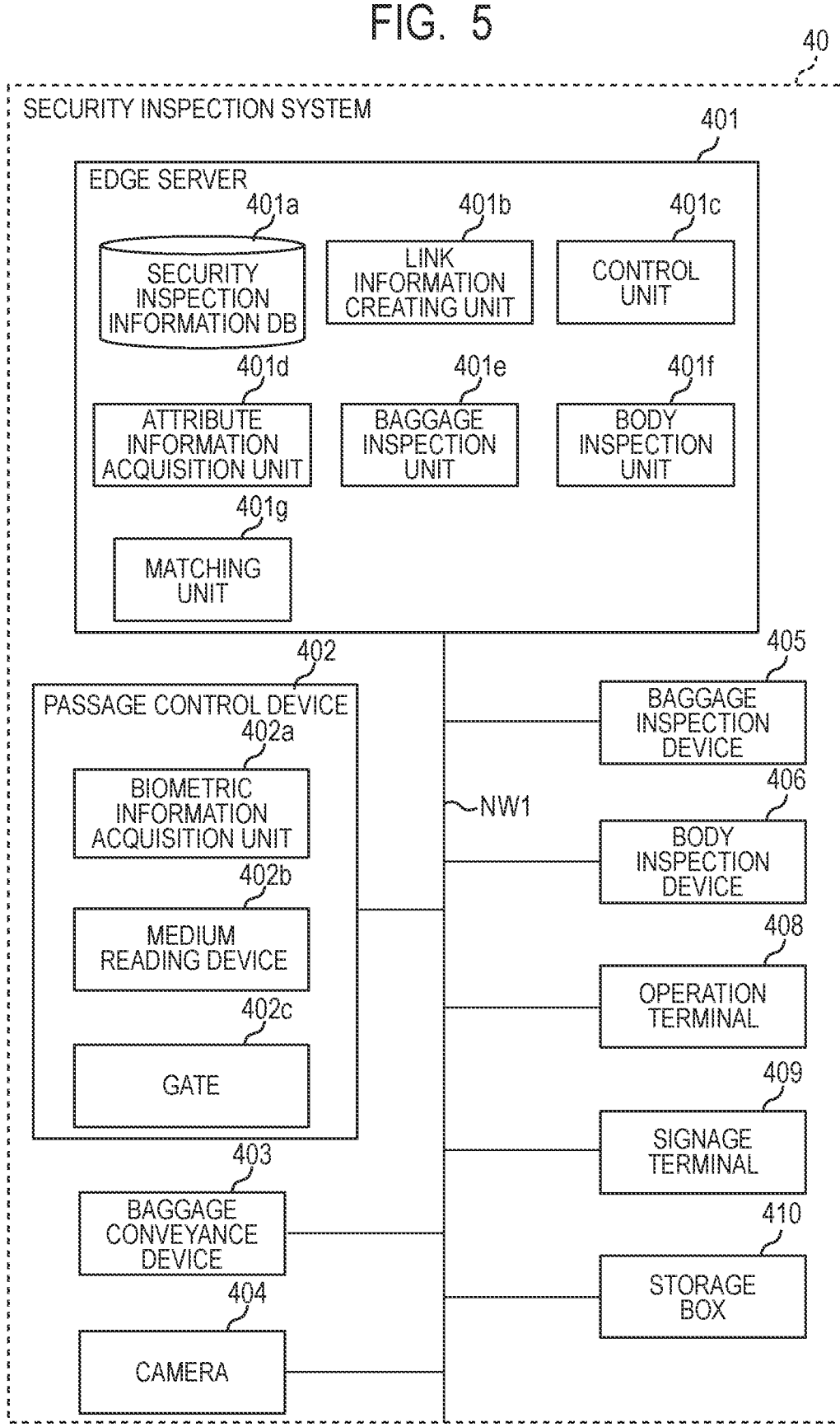
FIG. 5 is a block diagram illustrating an example of the overall configuration of a security inspection system according to the first example embodiment.
Figure 6:
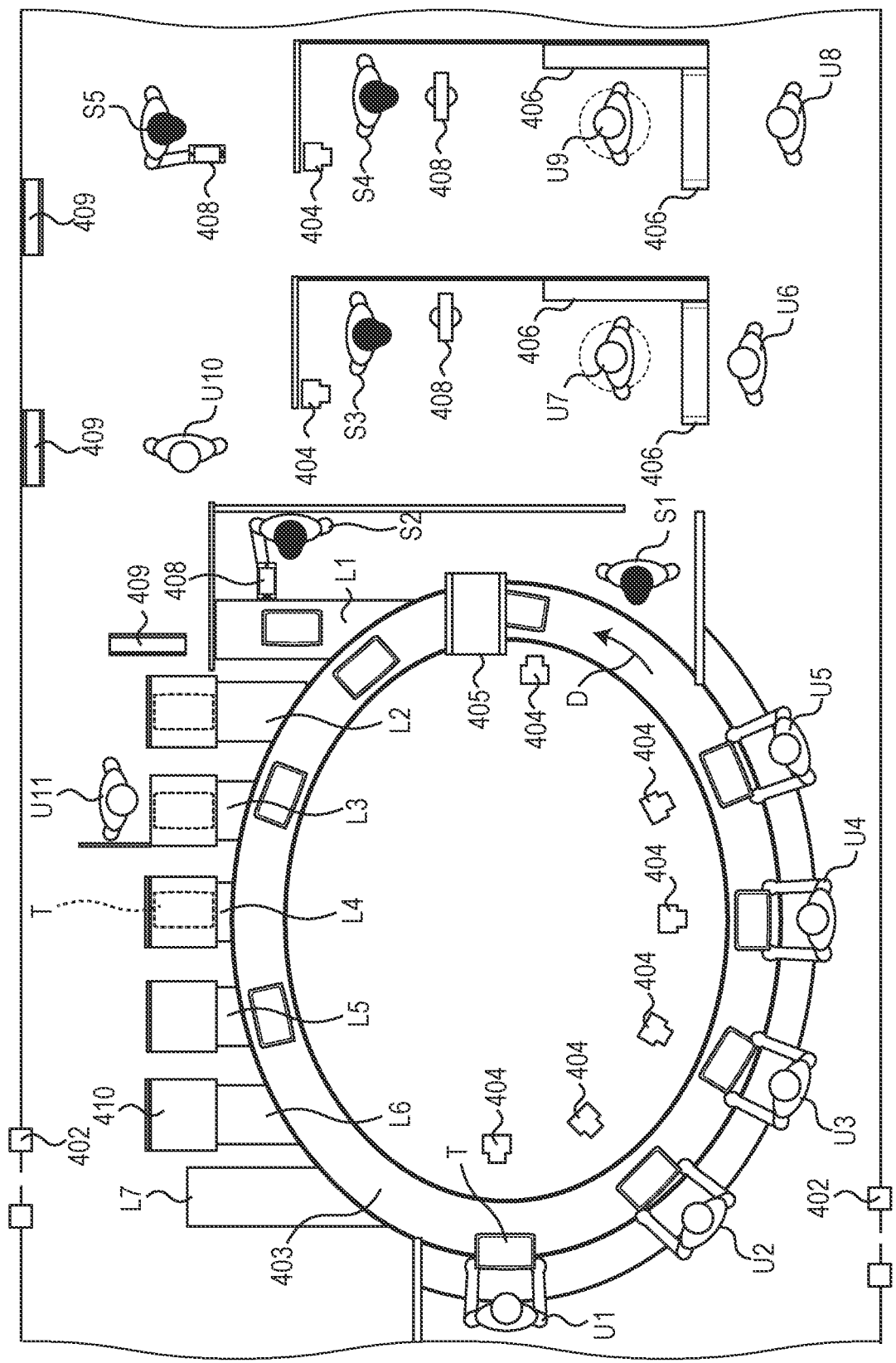
FIG. 6 is a schematic diagram illustrating an example of arrangement of devices in a security inspection site according to the first example embodiment.

The security inspection system 40 is a computer system installed in a security inspection site (Hereinafter referred to as "touch point P3".) in the airport A, and is formed of a plurality of devices. FIG. 5 is a block diagram illustrating an example of the overall configuration of the security inspection system 40. FIG. 6 is a schematic view illustrating an example of arrangement of devices in the security inspection site.

As illustrated in FIG. 5, the security inspection system 40 in the present example embodiment includes an edge server 401, a passage control device 402, a baggage conveyance device 403, a camera 404, a baggage inspection device 405, a body inspection device 406, an operation terminal 408, a signage terminal 409, and a storage box 410. The edge server 401 is connected to other equipment via a network NW1.

The edge server 401 is a server computer that manages the security inspection, and is connected to the management server 10 via the network NW (see FIG. 1). The edge server 401 may be a cloud server instead of a server installed in an airport facility. The edge server 401 is not necessarily required to be a single server but may be formed as a server group including a plurality of servers. The edge server 401 may be installed in one section of the security inspection site.

As illustrated in FIG. 5, the edge server 401 includes a security inspection information DB 401*a*, a link information creating unit 401*b*, a control unit 401*c*, an attribute information acquisition unit 401*d*, a baggage inspection unit 401*e*, a body inspection unit 401*f*, and a matching unit 401*g*.

Figures 7, 8:
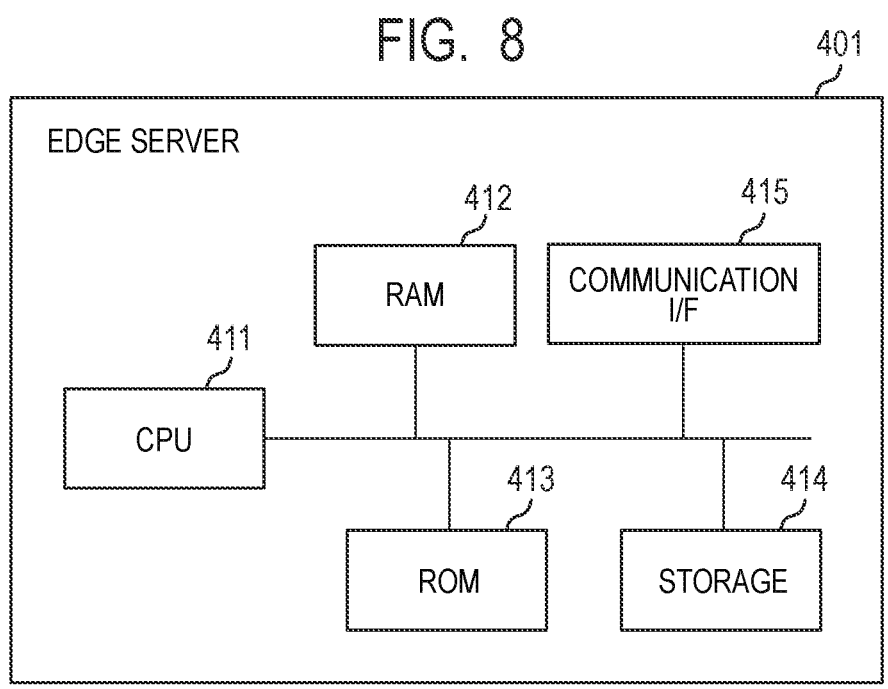
FIG. 7 is a diagram illustrating an example of information stored in a security inspection information database according to the first example embodiment.
FIG. 8 is a block diagram illustrating an example of a hardware configuration of an edge server according to the first example embodiment.

FIG. 7 is a diagram illustrating an example of information stored in the security inspection information DB 401*a*. The security inspection information DB 401*a* includes a target person ID, a captured face image, a token ID, a tray ID, a capturing time, a baggage inspection status (not executed/executing/completed), a baggage inspection result (normal/error), a body inspection status (not executed/executing/completed), a body inspection result (normal/error), a baggage storage location, a delivery status (not stored/in storage/delivery completion), a passport number, and person attribute information as data items. However, the database of the edge server 401 is not limited to the security inspection information DB 401*a*. The data items stored in the security inspection information DB 401*a* are not limited to those described above.

Specific examples of the person attribute information of User U include the security inspection history of (inspection result/inspection date and time, etc.), travel history (destination of travel/stopover place of travel/date and time of travel/the number of times of travel, etc.), a gender, an age, a nationality of the User U, with or without accompanying person, and membership category of the airline company. The person attribute information may be acquired from, for example, operation information (boarding reservation information) contained in the operation information DB 13 of the management server 10.

The link information creating unit 401*b* creates link information associating the biometric information of the user U who has requested entry into the departure area (restricted area) with identification information of the baggage possessed by the user U. In the present example embodiment, security inspection information registered in the security inspection information DB 401*a* for each target person corresponds to the link information.

The control unit 401*c* performs, in parallel based on the link information, the baggage inspection for determining whether or not an article (Hereinafter referred to as "target article".) restricted or prohibited to be brought into the restricted area is included in the baggage and a body inspection for determining whether or not a user U possesses the target article. That is, in the present example embodiment, the baggage inspection and the body inspection are interrelated while the inspections are performed independently.

The attribute information acquisition unit 401*d* acquires the attribute information of the user U from the management server 10 (operation information DB 13) by requesting the management server 10 to perform a matching process between the registered biometric information (registered face image) previously associated with the attribute information of the user U in the token ID information DB 11 and the biometric information (face image) of the user U acquired from the image captured by the camera 404 in the security inspection site.

The baggage inspection unit 401*e* performs the baggage inspection based on a learning model which learned in advance the relationship between an image (for example, an X-ray image) in which baggage is captured by using the baggage inspection device 405 described later and feature information about the target article.

The body inspection unit 401*f* performs the body inspection based on a learning model which learned in advance the relationship between an image (or measurement value) of capturing the body of the user U by using the body inspection device 406 described later and feature information about the target article.

The matching unit 401g performs the matching process between the biometric information of the user U newly acquired from the storage box 410, the signage terminal 409, and the biometric information registered in the security inspection information DB 401a, and outputs a matching result to the control unit 401c.

The passage control device 402 is installed at the entrance and the exit of the security inspection site and is a device for determining whether or not the user U is allowed to pass. The passage control device 402 includes a biometric information acquisition device 402a, a medium reading device 402b, and a gate 402c. The biometric information acquisition device 402a is, for example, a digital camera for capturing in front of the passage control device 402. When the biometric information acquisition device 402a detects the face of the user U standing in front of the passage control device 402 in an image to be constantly or periodically captured, the biometric information acquisition device 402a captures the face of the user U and acquires a face image.

Next, the passage control device 402 transmits the captured face image to the management server 10 via the edge server 401, and requests to perform authentication process as to whether or not the user U is a registrant of the token ID. When the user U is authenticated as the "registrant of the token ID" by the management server 10, the passage control device 402 opens the gate 402c to permit the user U to enter the security inspection site.

In the case of the user U whose token ID is not issued in the check-in procedure or the like, the passage control device 402 reads the recording information of the storage medium by the medium reading device 402b and determines whether or not the user U is allowed to pass the gate.

Examples of the medium reading device 402b include a code reader, an image scanner, a non-contact integrated circuit (IC) reader, an optical character reader (OCR) device, and the like. The storage medium may be, for example, a paper airline ticket, a portable terminal for displaying a copy of an e-ticket, and the like.

When the identity verification of the user U in the passage control device 402 is successful, the gate 402c transitions from a closed state to block passage of the user U during standby to an opened state to permit passage of the user U. The system of the gate 402c is not particularly limited and may be, for example, a flapper gate whose flapper provided on one side of the pathway or flappers provided on both sides of the pathway are opened and closed, a turn style gate whose three bars rotate, or the like.

The baggage conveyance device 403 is a conveyance device for automatically conveying baggage on a belt conveyor moving in a predetermined direction to a baggage inspection device 405 or a storage location. The edge server 401 performs drive control of the baggage conveyance device 403 to switch the baggage conveyance destination (storage location).

The camera 404 is, for example, a charge coupled device (CCD) image sensor or a digital camera equipped with a complementary metal oxide semiconductor (CMOS) image sensor. The camera 404 sequentially transmits the captured images to the edge server 401.

The baggage inspection device 405 is a device for inspecting whether or not the target article (dangerous article, etc.) is included in the baggage received from the user U in a non-contact manner. Examples of the baggage inspection device 405 include an X-ray scanner, a CT scanner, etc., which uses X-rays to capture a carry-on baggage and outputs the captured image to the edge server 401. As the baggage inspection device 405, it is preferable to use a CT scanner capable of taking a three-dimensional X-ray image in order to improve detection accuracy. When receiving the captured image from the baggage inspection device 405, the edge server 401 determines, based on a predetermined learning model, whether or not the target article restricted to be brought into the cabin is included in the baggage.

The body inspection device 406 is a device for examining whether or not the user U possesses the target article in a non-contact manner. The body inspection device 406 may be a metal detector, a millimeter wave scanner, a terahertz wave scanner, and the like. The metal detector is a device to check whether or not the user U wears metals that may be dangerous object. In airport facilities, gate-type metal detectors are generally used.

The millimeter wave scanner is, for example, a device that irradiates a millimeter wave to the body of the user U, measures energy of a reflected wave from the body of the user U, and images the body of the user U. The millimeter wave is, for example, an electromagnetic wave having a wavelength of 1 millimeter or more and 10 millimeters or less and a frequency band of about 30 GHz to 300 GHz.

Similarly, the terahertz wave scanner is a device for imaging the body of the user U using the terahertz wave. The terahertz wave is, for example, an electromagnetic wave having a wavelength of 100 micrometers or more and 1 millimeter or less and a frequency band of about 300 GHz to 3 THz. There are two types of millimeter wave scanners and terahertz wave scanners. Two types are a passive type for measuring electromagnetic waves naturally emitted from a target object and an active type for measuring reflected waves when the target object is irradiated with electromagnetic waves.

A process between the edge server 401 (body inspection unit 401f) and the active millimeter-wave scanner (body inspection device 406) will be described below.

When the edge server 401 receives a measured value (signal) obtained by measuring the body of the user U from the millimeter wave scanner, the edge server 401 determines whether or not the target article is included in the body of the user U based on a predetermined learning model. When the target article is included in the body of the user U, the edge server 401 displays, on the operation terminal 408 or the like, an image in which, for example, information indicating the location of the target article is superimposed on a schematic diagram of the human body. The data measured by the millimeter wave scanner is preferably erased after a predetermined time has elapsed.

The edge server 401 may also create a transparent image based on a signal of the reflected wave received by the millimeter wave scanner. The edge server 401 may determine whether or not a predetermined target article is possessed based on the shape indicated in the transparent image.

As an example of the determination method based on the shape indicated in the transparent image, a method using the machine learning as described above is considered. For example, by preparing a transparent image (training data) of a predetermined target article and performing the machine learning based on the training data, a learning model for estimating the target article indicated in the transparent image may be created. The edge server 401 may determine whether or not a predetermined target article is indicated in the transparent image based on the created transparent image and the learning model.

As another example, the edge server 401 may search for a predetermined target article in the transparent image by template matching using a template illustrating the shape of the predetermined target article.

The edge server 401 may also determine whether or not the user U possesses a predetermined target article based on the feature amount (transmission feature amount) that is indicated in the signal of the reflected wave received from the millimeter wave scanner. That is, the edge server 401 may perform the above-described determination process using the signal of the reflected wave without creating the transparent image.

In this case, there are also examples of using the learning model based on the machine learning described above and examples of using template matching. The edge server 401 can also learn a learning model used for baggage inspection of an X-ray image by the same method.

The operation terminal 408 is a terminal device used by the staff S for its operation. Examples of the operation terminal 408 include a personal computer, a tablet terminal, a smartphone, etc., but the operation terminal 408 is not limited to these terminals. In FIG. 6, two types of mobile type and fixed type are illustrated as the operation terminals 408 used by the staffs S1 to S5. The operation terminal 408 displays the information received from the edge server 401 on a screen.

The signage terminal 409 is a display terminal for presenting various kinds of guide information received from the edge server 401 to the user U. In the present example embodiment, the signage terminal 409 presents a baggage storage location (storage box 410) and a baggage inspection status to the user U based on the face authentication.

The storage box 410 is a device for storing the baggage of the user U, the baggage is conveyed by the baggage conveyance device 403. In the present example embodiment, when the user U is authenticated as the owner of the baggage, the edge server 401 unlocks the electronic lock of the storage box 410 and delivers the baggage to the user U.

FIG. 6 shows a plurality of users U1 to U11 and a plurality of staffs S1 to S5 in the security inspection site. The left area in the figure is a baggage inspection area and a storage area of the baggage. The five users U1 to U5 place the baggage on the belt conveyor of the baggage conveyance device 403 with the baggage stored in a prescribed conveyance tray T. Thus, the conveyance tray T moves in the direction of the arrow D. The conveyance tray T storing the baggage is inserted into the baggage inspection device 405. The baggage inspection device 405 and the edge server 401 (not illustrated) cooperate to inspect the baggage in the conveyance tray T.

Staffs S1 and S2 are positioned on the right side of the baggage conveyance device 403 in the figure. The staff S1 judges a state of the conveyance tray T in which the baggage is stored, and performs an operation for dividing the baggage into a plurality of trays and flowing the baggage into the baggage inspection device 405 as necessary. At this time, it is preferable for the staff S1 to use a dedicated tray.

More specifically, another code indicating that the baggage separated from the one preceding conveyance tray T is stored, for example, may be printed on the surface of the dedicated tray. Thus, even after the user U and the baggage are separated, the baggage can be easily associated with the user U.

Further, a total of seven lanes of an error lane L1, normal lanes L2 to L6, and an unclear lane L7 are branched and provided on the downstream side in the conveyance direction of the baggage conveyance device 403. The error lane L1 is a re-inspection lane for conveying the baggage in which the target article is detected. A staff S2 is arranged in the error lane L1. The normal lanes L2 to L6 are the lanes for conveying the baggage in which the target article is not detected, and the storage boxes 410 are respectively provided at the destination of the normal lanes L2 to L6. The baggage is automatically stored from the back side of the storage box 410. The unclear lane L7 is a lane for conveying the conveyance tray T whose owner is unclear.

On the other hand, the area on the right side in the figure is a body inspection area, and two inspection lanes are illustrated. The body inspection device 406 and the operation terminal 408 is provided on each inspection lane. The body inspection is composed of two types, for example, an inspection by the metal detector and an inspection by the millimeter wave scanner. FIG. 6 illustrates the users U7 and U9 undergoing the body inspection with the body inspection device 406.

The user U10 is a person who has completed the body inspection and is standing in front of the signage terminal 409. When the signage terminal 409 captures the face image of the user U10, the signage terminal 409 transmits the captured face image to the edge server 401. The signage terminal 409 displays information on the storage location of the baggage or the status of the baggage inspection according to the authentication result in the edge server 401.

Further, it is preferable that the signage terminal 409 displays an image of the baggage in which the baggage inspection is normally completed (or a face image of the owner of the baggage) and the number of the storage box 410 at the storage location in a list format.

The storage box 410 transmits the captured face image to the edge server 401 when the storage box 410 captures the face image of each user U. The storage box 410 unlocks the electronic lock when the authentication in the edge server 401 is successful. For example, it is indicated that the user U11 has been successfully authenticated and removed own baggage from the storage box 410. As described above, when the security inspection by the security inspection system 40 is completed at the touch point P3, the users U1 to U11 move to the departure inspection site.

The automated gate apparatus 50 is installed in the departure inspection site (Hereinafter referred to as "touch point P4".) in the airport A. The automated gate apparatus 50 is a device for automatically performing departure inspection procedure for the user U. When the user U finishes the departure inspection procedure at the touch point P4, the user U moves to the departure area where a duty-free shop and the boarding gate are provided.

The boarding gate apparatus 60 is a gate device installed at each boarding gate (Hereinafter referred to as "touch point P5".) of the departure area. The boarding gate apparatus 60 confirms that the user U is a passenger of an airplane who is allowed to board via the boarding gate. Upon completion of the procedure at the touch point P5, the user U boards the cabin and departs for the second country.

FIG. 8 is a block diagram illustrating an example of a hardware configuration of the edge server 401 according to the present example embodiment. As illustrated in FIG. 8, the edge server 401 includes a central processing unit (CPU) 411, a random access memory (RAM) 412, a read only memory (ROM) 413, a storage 414, and a communication I/F (Interface) 415 as computers that perform operations, control, and storage. The devices are connected to each other via a bus, wiring, a driving device, etc.

The CPU 411 is a processor that has a function of performing a predetermined operation according to a program stored in the ROM 413 or the storage 414 and controlling each section of the edge server 401. The RAM 412 is formed of a volatile storage medium and provides a temporary memory area required for the operation of the CPU 411.

The CPU 411 performs the programs stored in the ROM 413 or the like by loading them into the RAM 412, thereby realizing the functions of the link information creating unit 401b, the control unit 401c, the attribute information acquisition unit 401d, the baggage inspection unit 401e, the body inspection unit 401f, the matching unit 401g, and the like.

The ROM 413 is formed of a nonvolatile storage medium and stores necessary information such as a program used for operation of the edge server 401. The storage 414 is formed of a nonvolatile storage medium, and stores programs and data for operation of the edge server 401. The storage 414 includes, for example, a hard disk drive (HDD) or a solid state drive (SSD).

The communication I/F 415 is a communication interface based on standards such as Ethernet (registered trademark), Wi-Fi (registered trademark), and 4G, and is a module for communicating with other devices.

The hardware configuration illustrated in FIG. 8 is an example, and other devices may be added or some devices may not be provided. Some devices may be replaced with other devices having similar functions. Also, some of the functions of the present example embodiment may be provided by other devices (e.g., the management server 10) via the networks NW and NW1, and the functions of the present example embodiment may be realized by being distributed among a plurality of devices. As described above, the hardware configuration illustrated in FIG. 8 can be changed appropriately.

Next, the operation of the security inspection system 40 in the present example embodiment will be described with reference to FIGS. 9 to 23.

<Association Between User and Baggage>

Figure 9:
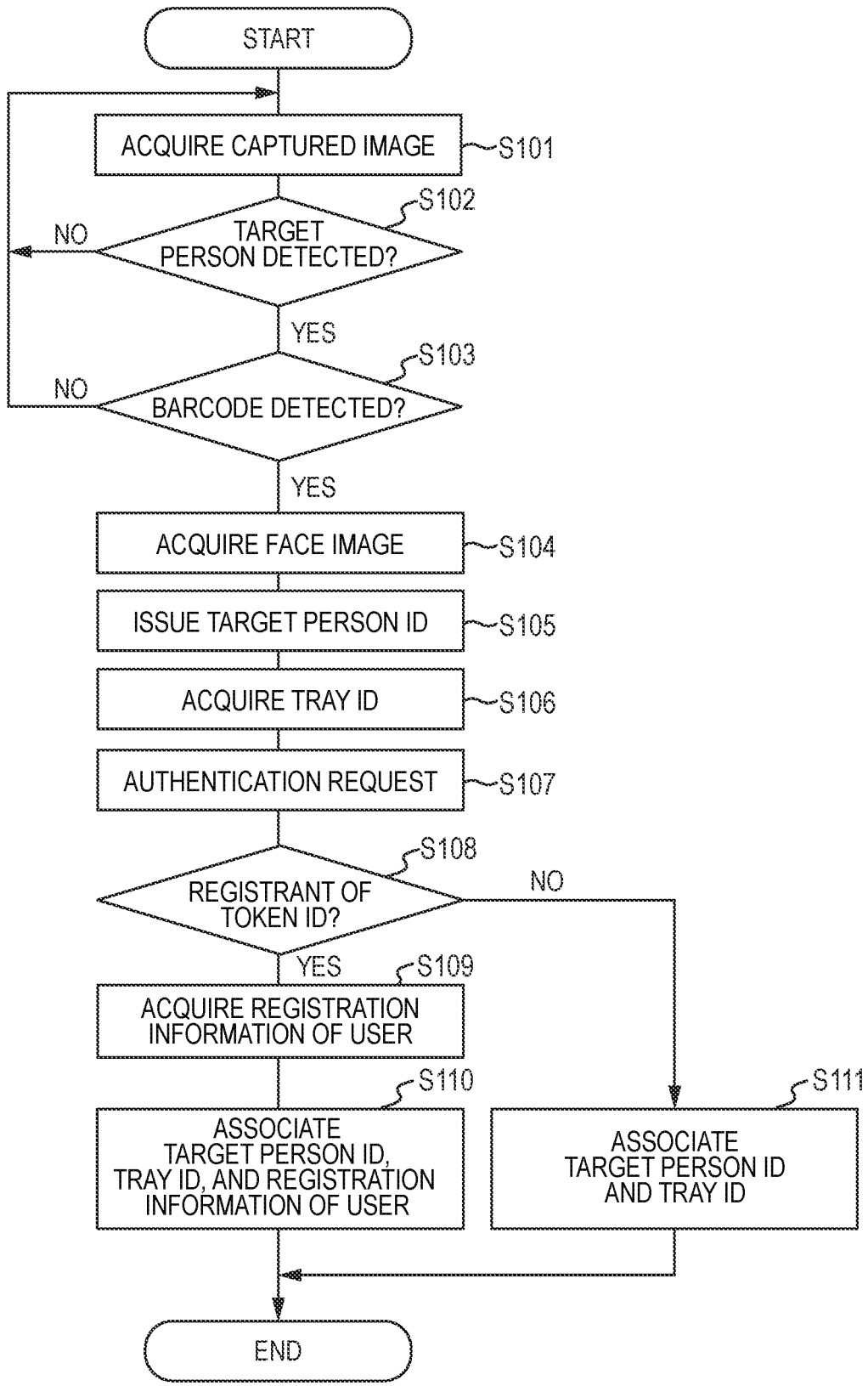
FIG. 9 is a flowchart illustrating an example of process of the edge server according to the first example embodiment.

FIG. 9 is a flowchart illustrating an example of a process of the edge server 401. This process is executed in order to associate the user U, who is the owner of the baggage, with the baggage when the user U undergoes the baggage inspection at the security inspection site.

First, the edge server 401 acquires an image captured by the camera 404 (step S101). Next, when the edge server 401 determines that the user U who is the target person of the security inspection has been detected in the acquired captured image (step S102, YES), the process proceeds to step S103.

On the other hand, when the edge server 401 determines that the user U has not been detected in the acquired captured image (step S102, NO), the process returns to step S101.

Next, when the edge server 401 determines that a predetermined barcode attached to the surface of the conveyance tray has been detected from the captured images (step S103, YES), the process proceeds to step S104.

On the other hand, when the edge server 401 determines that a predetermined barcode attached to the surface of the conveyance tray has not been detected from the captured images (step S103, NO), the process returns to step S101. That is, the processes of steps S101 to S103 are repeated until a captured image in which the target person and the barcodes of the conveyance tray are shown together is acquired.

Figure 10:
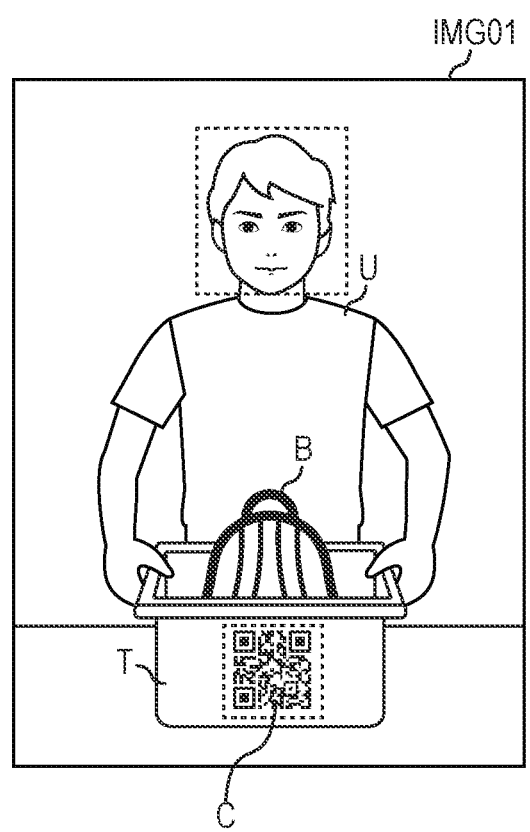
FIG. 10 is a diagram illustrating an example of an image captured at the start of a security inspection according to the first example embodiment.

FIG. 10 is a diagram illustrating an example of an image captured at the start of the security inspection. Here, a captured image IMG01 captured when the user U stores the baggage B in the conveyance tray T is illustrated. A barcode C indicating the tray ID is printed on the surface of the conveyance tray T. In this way, the face image (biometric information) of the user U and the identification information of the conveyance tray T are simultaneously acquired from one captured image IMG01, and link information is created. When the user U separately stores the baggage B in a plurality of conveyance trays T, it is assumed that a plurality of link information items are created.

Next, the edge server 401 acquires a face image of the user U from the captured images (step S104). When a plurality of persons are included in the same captured image, it is preferable to determine the positional relationship between the persons based on the distance between the eyes or the like, and to acquire a face image of a person positioned in front.

Next, the edge server 401 issues a target person ID unique to the user U (step S105). The target person ID is set separately from the token ID. The target person ID is, for example, a sequence number that is not the same as those of the other persons.

Next, the edge server 401 decodes the barcode detected in step S103 to acquire a tray ID for identifying the conveyance tray (step S106). Next, the edge server 401 transmits an authentication request to the management server 10 based on the face image acquired in step S104 (step S107). When receiving the authentication requests from the edge server 401, the management server 10 respectively matches the face image of the user U included in the authentication request with a plurality of registered face images stored in the token ID information DB 11.

Next, when the edge server determines that the user U is the registrant of the token ID based on the authentication result in the management server 10 (step S108, YES), the process proceeds to step S109. The edge server 401 acquires registration information (person attribute information) of the user U from the management server 10 using the token ID as a key (step S109).

Then, the edge server 401 registers the security inspection information in which the target person ID, the tray ID, and the registration information (person attribute information) are associated with each other in the security inspection information DB 401a (step S110), and ends the process.

On the other hand, when the edge server 401 determines, based on the authentication result of the management server 10, that the user U is not the registrant of the token ID (step S108, NO), the process proceeds to step S111. The edge server registers the security inspection information associated with the target person ID and the tray ID in the security inspection information DB 401a (step S111), and ends the process.

<Baggage Inspection>

Figure 11:
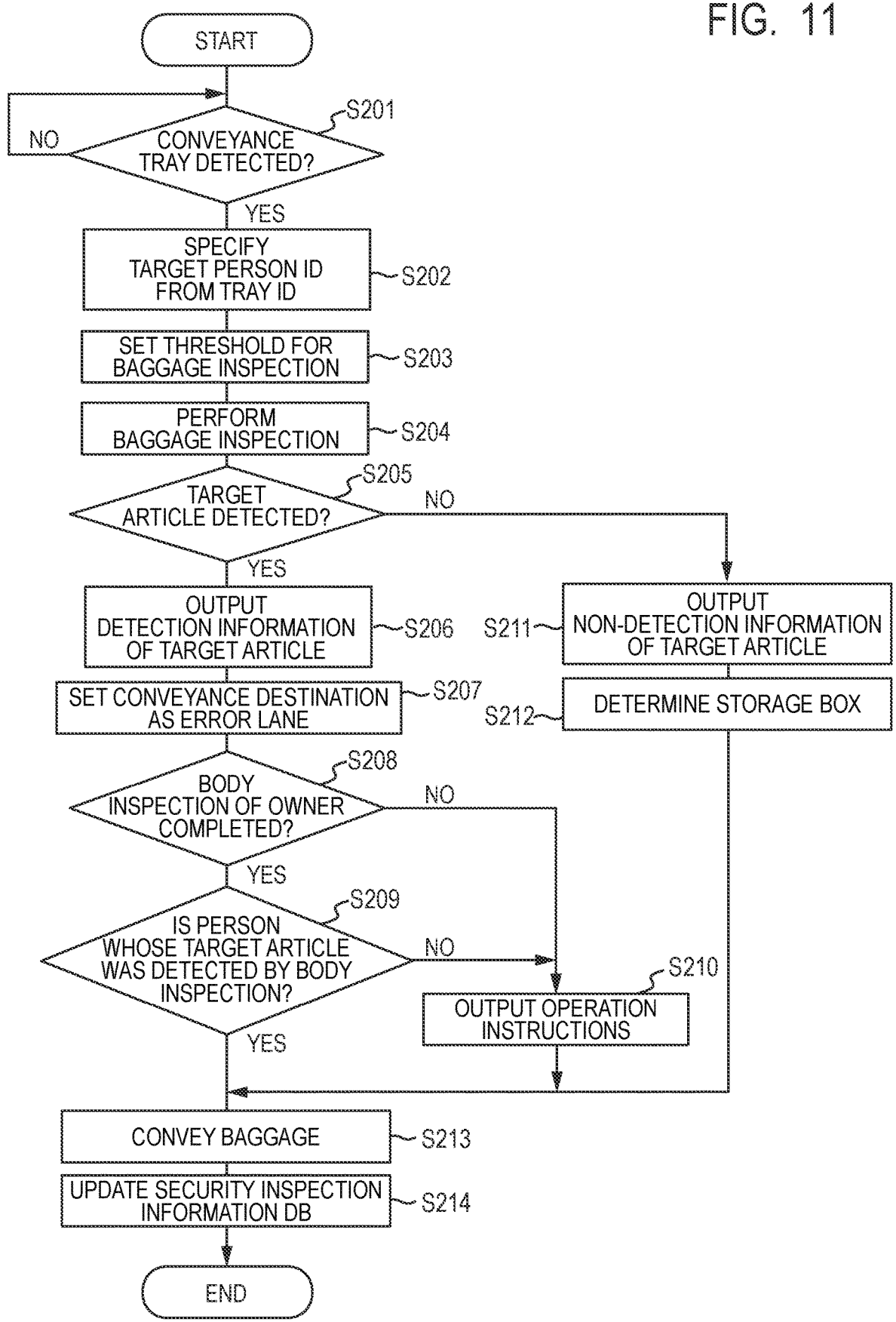
FIG. 11 is a flowchart illustrating an example of a process during a baggage inspection of the edge server according to the first example embodiment.

FIG. 11 is a flowchart illustrating an example of process of the edge server 401 during baggage inspection. This process is executed, for example, when the baggage stored in the conveyance tray is carried to the position (That is, where the baggage inspection is carried out) of the baggage inspection device 405 by the driving of the baggage conveyance device 403.

First, when the edge server 401 determines that a conveyance tray moving into the baggage inspection device 405 has been detected from images captured by the camera 404 installed in the vicinity of the baggage inspection device 405 (step S201, YES), the process proceeds to step S202. On the other hand, when the edge server 401 determines that the conveyance tray has not been detected (step S201, NO), the standby state is maintained.

Next, the edge server 401 acquires the tray ID of the conveyance tray by image analysis of the captured image, and specifies the target person ID by referring to the security inspection information DB 401a with the tray ID as a key (step S202).

Next, the edge server 401 sets a threshold value of the detection condition of the target article in the baggage inspection based on various kinds of information associated with the target person ID (step S203). Details of the process will be described later. The threshold is, for example, a determination threshold of a similarity score with the target article.

Next, the edge server 401 performs baggage inspection in cooperation with the baggage inspection device 405 (step S204). Specifically, the edge server 401 performs image analysis process of the image captured by the baggage inspection device 405.

Next, when the edge server determines that the target article has been detected in the baggage by the image analysis process (step S205, YES), the edge server 401 outputs the detection information of the target article to the predetermined operation terminal 408 (step S206). Next, the edge server 401 sets, as the error lane, the conveyance destination of the baggage in which the target article is detected (step S207). Thereafter, the process proceeds to step S208.

On the other hand, when the edge server 401 determines that the target article has not been detected in the baggage by the image analysis process (step S205, NO), the process proceeds to step S211.

Next, the edge server 401 refers to the security inspection information DB 401a with the target person ID as a key, and determines whether or not the body inspection of the owner of the baggage has been completed (step S208).

When the edge server 401 determines that the body inspection of the baggage owner has been completed (step S208, YES), the process proceeds to step S209. On the other hand, when the edge server 401 determines that the body inspection of the owner is not completed (step S208, NO), the process proceeds to step S210.

In step S209, the edge server 401 refers to the security inspection information DB 401a with the target person ID as a key, and determines whether or not the user U is a person whose target article was detected by the body inspection.

If the edge server 401 determines that the user U is a person whose target article was detected by the body inspection (step S209, YES), the process proceeds to step S213.

On the other hand, when the edge server 401 determines that the user U is not the person whose target article was detected by the body inspection (step S209, NO), the process proceeds to step S210.

In step S210, the edge server 401 outputs an operation instruction to the predetermined operation terminal 408. For example, it is assumed that the user U waits in the area adjacent to the exit of the body inspection area until the baggage inspection is completed when a target article of the user U is detected in the baggage inspection and a target article of the user U is not detected in the body inspection Similarly, it is assumed that a user U is lined up in front of the entrance of the body inspection area or is undergoing the body inspection when a target article of the User U is detected in the baggage inspection and the user U has not completed the body inspection.

In step S211, the edge server 401 outputs non-detection information of the target article to the predetermined operation terminal 408. Then, the edge server 401 determines a storage box 410 to be a storage location of the baggage (step S212). Thereafter, the process proceeds to step S213. When there is a plurality of pieces of baggage for the same person, it is preferable to set the storage locations in adjacent lanes or in the same lane.

In step S213, the edge server 401 outputs driving control information to the baggage conveyance device 403, and conveys the baggage to the conveyance destination (storage location) determined in the step S207 or the step S212. Then, the edge server 401 updates the security inspection information of the security inspection information DB 401a based on the target person ID of the user U and the inspection result of the baggage inspection (step S214), and ends the process.

Figure 12:
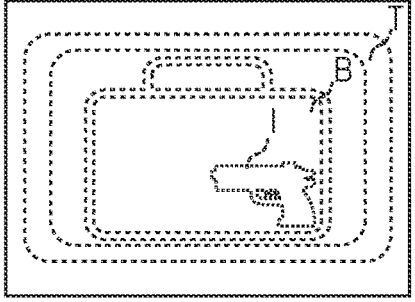
FIG. 12 is a diagram illustrating an example of a screen displayed on an operation terminal on the side of a baggage inspection area according to the first example embodiment.

FIG. 12 is a diagram illustrating an example of a screen displayed on the operation terminal 408 on the side of the baggage inspection area. An upper area of the screen includes the following error message to prompt the staff S to inspect the baggage in detail. "The target article is detected in the user's baggage. The tray has been transported to the re-inspection lane, so please check the baggage.". A lower area of the screen includes user information such as the name and gender of the user U, the baggage inspection result, and the X-ray image IMG02. The X-ray image IMG02 illustrates a state in which a gun as the target article I is detected in the baggage B.

Figure 13:
FIG. 13 is a diagram illustrating an example of a screen displayed on the operation terminal on the side of a body inspection area according to the first example embodiment.

On the other hand, FIG. 13 is a diagram illustrating an example of a screen displayed on the operation terminal 408 on the side of the body inspection area. An upper area of the screen includes the following error message to instruct the staff S on the side of the body inspection area to guide the user U. "The target article is detected in the user's baggage. Please guide the user to another room immediately." A lower area of the screen includes a baggage inspection result, information indicating the current position of the user U, user information of the user U, a captured face image IMG03, and an X-ray image IMG02. Thus, the staff S can search for the user U based on the information on the operation instruction screen and promptly guide the user U.

Figure 14:
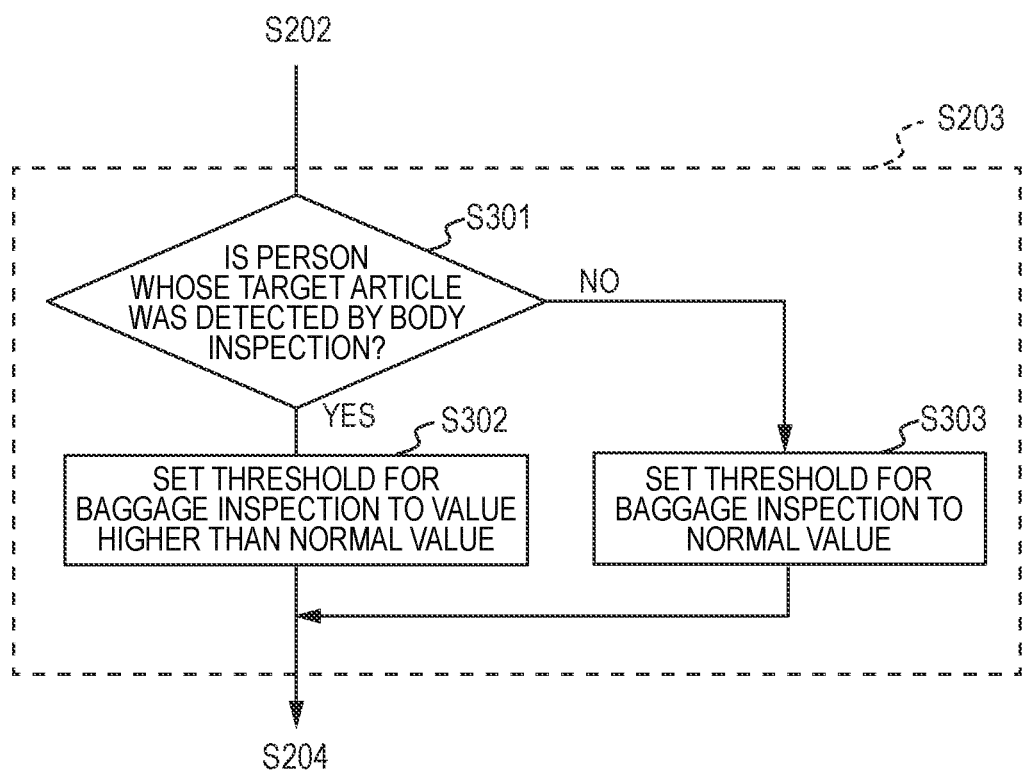
FIG. 14 is a flowchart illustrating an example of a process of the edge server according to the first example embodiment.

Next, a description will be given of a method for setting the detection conditions of the target article in the baggage inspection. FIG. 14 is a flowchart illustrating an example of process of the edge server 401. This process corresponds to the process of step S203 in FIG. 11.

In step S301, the edge server 401 determines whether or not the user U is a person whose target article has been detected in the body inspection. When the edge server determines that the user U is a person whose target article has been detected in the body inspection (step S301, YES), the edge server 401 sets the threshold value of the baggage inspection to a value higher than the normal value (step S302), and the process proceeds to the step S204. That is, the detection condition of the target article is much more restricted than that of the current condition.

On the other hand, when the edge server 401 determines that the user U is not the person whose target article has been detected in the body inspection (step S301, NO), the edge server sets the threshold value of the baggage inspection to the normal value (step S303), and the process proceeds to the step S204.

<Body Inspection>

Figure 15:
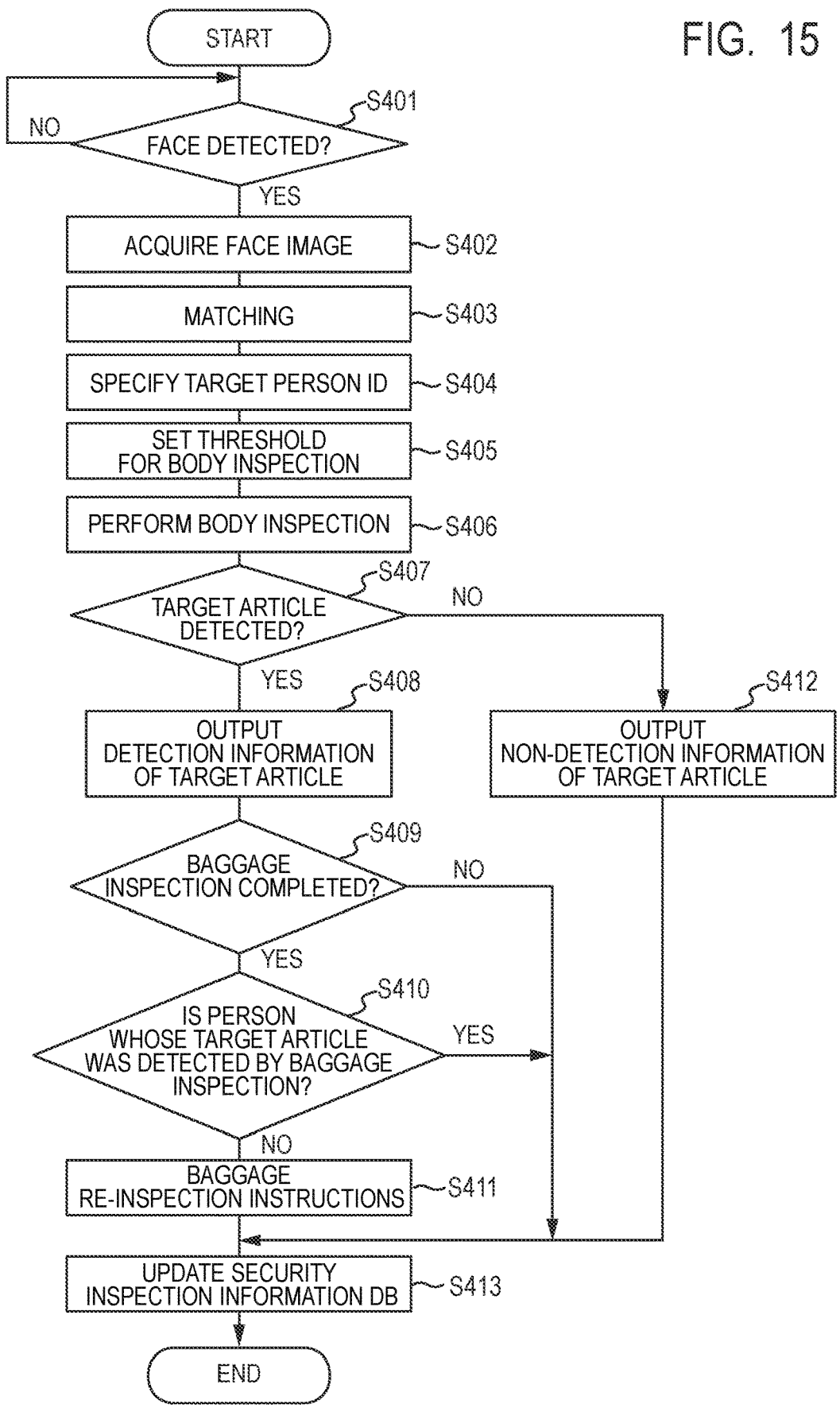
FIG. 15 is a flowchart illustrating an example of process of the edge server during a body inspection according to the first example embodiment.

FIG. 15 is a flowchart illustrating an example of process of the edge server 401 at the time of body inspection. This process is executed for the user U who deposited the baggage in the baggage inspection area, for example.

First, the edge server 401 analyzes the captured image received from the camera 404 installed in the body inspection area, and determines whether or not the face of the user U has been detected (step S401). Here, the edge server 401 waits until the face of the user U is detected (step S401, NO).

Next, when the edge server 401 determines that the face of the user U has been detected (step S401, YES), the edge server acquires the face image of the user U from the captured image (step S402). Next, the edge server 401 performs one-to-N matching process on the acquired face image with the plurality of captured face images stored in the security inspection information DB 401a (step S403).

Next, the edge server 401 specifies the target person ID associated with the captured face image that is successfully matched the face image of the security inspection information DB 401a (step S404).

Next, the edge server 401 sets a threshold value as a detection condition of the target article in the body inspection based on various kinds of information associated with the target person ID (step S405). Details of the process will be described later.

Next, the edge server 401 performs a body inspection in cooperation with the body inspection device 406 (step S406). Specifically, the edge server 401 performs analysis process of the measurement signal measured by the body inspection device 406.

When the edge server determines that the target article has been detected in the body of the user U by the analysis process (step S407, YES), the edge server 401 outputs the detection information of the target article to the predetermined operation terminal 408 (step S408). Thereafter, the process proceeds to step S409.

On the other hand, when the edge server 401 determines that the target article has not been detected in the body of the user U (step S407, NO), the edge server 401 outputs non-detection information of the target article to the predetermined operation terminal 408 (step S412). Thereafter, the process proceeds to step S413.

Next, the edge server 401 refers to the security inspection information DB 401a with the target person ID as a key. When the edge server 401 determines that the baggage inspection is completed (step S409, YES), the process proceeds to step S410. On the other hand, when the edge server 401 determines that the baggage inspection is not completed (step S409, NO), the process proceeds to step S413.

In step S410, the edge server 401 refers to the security inspection information DB 401a with the target person ID as a key, and determines whether or not the user U is a person whose target article has been detected in the baggage inspection.

When the edge server 401 determines that the user U is a person whose target article has been detected in the baggage inspection (step S410, YES), the process proceeds to step S413.

On the other hand, when the user U determines that the user U is not the person whose target article has been detected in the baggage inspection (step S410, NO), the edge server 401 displays a screen for instructing the operation terminal 408 on the side of the baggage inspection area to re-inspect the baggage (step S411).

Then, the edge server 401 updates the security inspection information of the security inspection information DB 401a based on the target person ID of the user U and the inspection result of the baggage inspection (step S413), and ends the process.

Figures 16, 17:
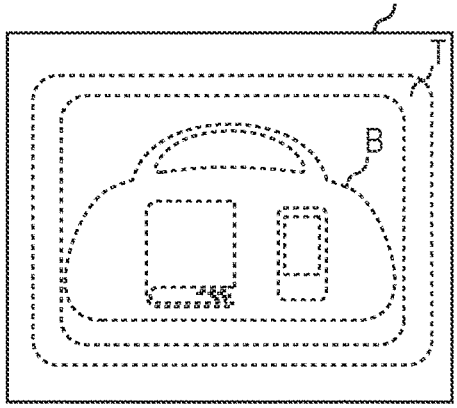
FIG. 16 is a diagram illustrating an example of a screen displayed on the operation terminal on the side of the body inspection area according to the first example embodiment.
FIG. 17 is a diagram illustrating an example of a screen displayed on the operation terminal on the side of the baggage inspection area according to the first example embodiment.

FIG. 16 is a diagram illustrating an example of a screen displayed on the operation terminal 408 on the side of the body inspection area. The upper area of the screen includes an error message "The target article is detected. Please check the detection point.". The error message indicates that the target article has been detected in the body of the user U. The user information of the user U and the result of the body inspection are displayed in the lower area of the screen. The body inspection result includes an image IMG04 of a schematic drawing on the front side of the human body and an image IMG05 of a schematic drawing on the back side. Here, in the image IMG05, a knife as the target article I is displayed at the position of the right thigh of the user U.

On the other hand, FIG. 17 is a diagram illustrating an example of a screen displayed on the operation terminal 408 on the side of the baggage inspection area. The upper area of the screen includes an error message "The target article is detected by the body inspection. Please re-check the baggage in box No. 2.". The message instructs the staff S on the side of the baggage inspection area to re-inspect the baggage. The screen of FIG. 17 may be displayed in order to cause the baggage inspection to be performed again in accordance with the result of the body inspection when the target article has not been detected in the baggage inspection performed for the user U.

Figure 18:
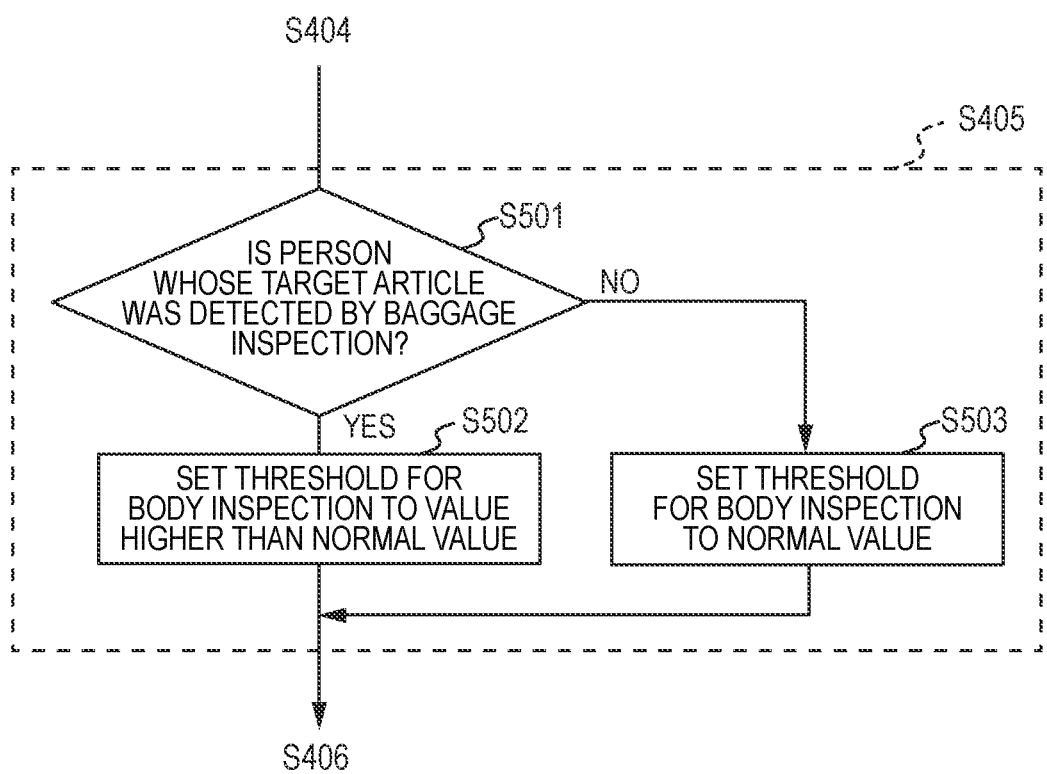
FIG. 18 is a flowchart illustrating an example of edge server process according to the first example embodiment.

Next, a description will be given of a method for setting detection conditions of the target article in a body inspection. FIG. 18 is a flowchart illustrating an example of process of the edge server 401. This process corresponds to the process of step S405 in FIG. 15.

In step S501, the edge server 401 determines whether or not the user U is a person whose target article has been detected in the baggage inspection. Here, when the edge server 401 determines that the user U is a person whose target article has been detected in the baggage inspection (step S501, YES), the edge server 401 sets the threshold value of the body inspection to a value higher than the normal value (step S502), and the process proceeds to step S406. That is, the detection condition of the target article at the time of body inspection is much more restricted than that of the current condition.

On the other hand, when the edge server determines that the user U is not the person whose target article has been detected in the baggage inspection (step S501, NO), the edge server 401 sets the threshold value of the body inspection to the normal value (step S503), and the process proceeds to step the S406.

<Guidance of Storage Location>

Figure 19:
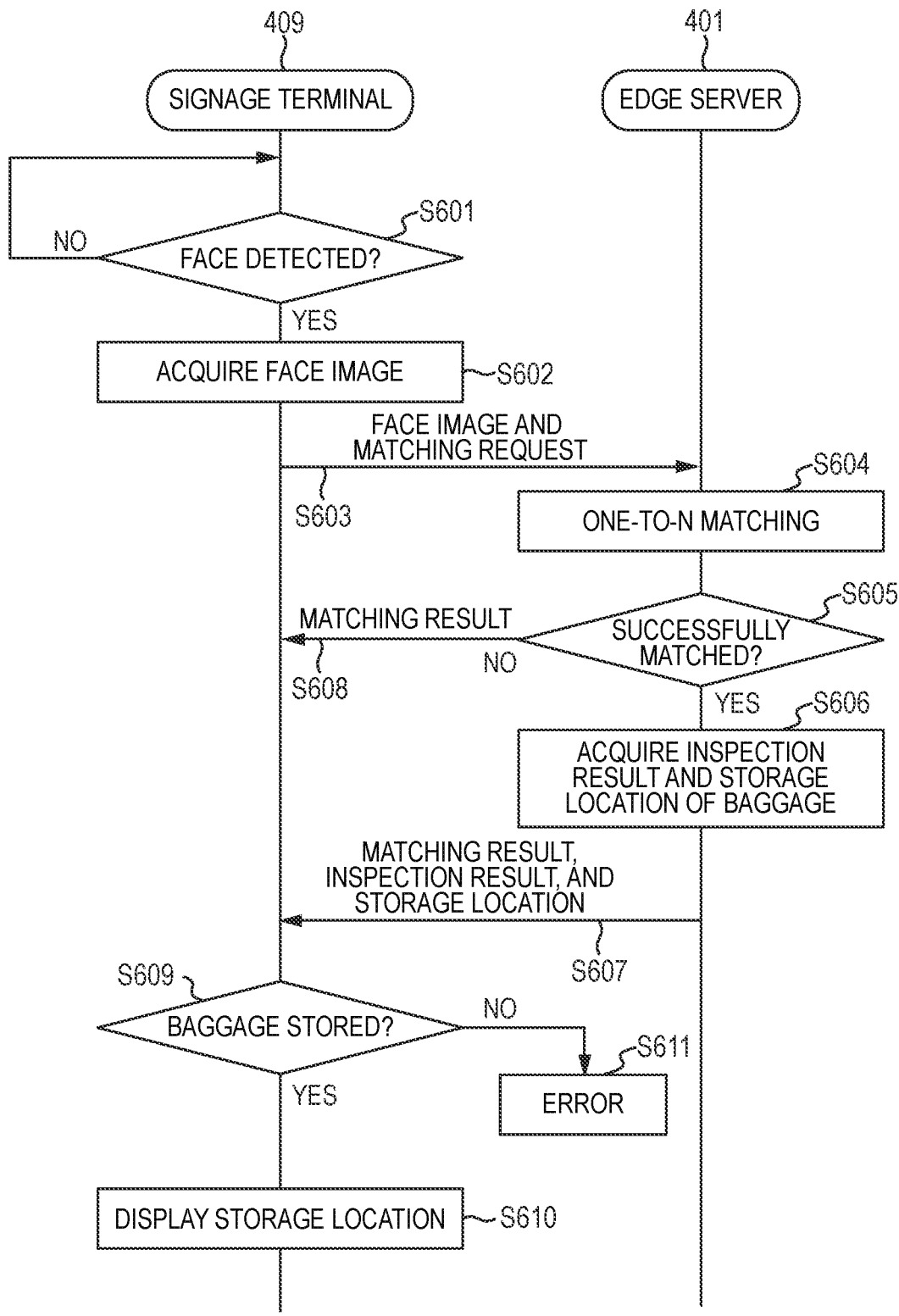
FIG. 19 is a sequence diagram illustrating an example of a process between the edge server and a signage terminal according to the first example embodiment.

FIG. 19 is a sequence diagram illustrating an example of process between the edge server 401 and the signage terminal 409. This process is executed for the user U who has completed the body inspection.

The signage terminal 409 constantly or periodically captures an image front of the signage terminal 409, and determines whether the face of the user U standing in front of the signage terminal 409 has been detected in the captured image (step S601). When the signage terminal 409 determines that the face of the user U has not been detected in the image (step S601, NO), the signage terminal 409 waits until the face of the user U is detected in the image.

When the signage terminal 409 determines that the face of the user U has been detected (step S601, YES), the signage terminal acquires the face image of the user U as an object face image from the captured images (step S602).

Next, the signage terminal 409 transmits the face image (target face image) of the user U to the edge server 401 together with a matching request (step S603). Thus, the signage terminal 409 requests the edge server 401 to perform one-to-N matching between the target face image of the user U and a plurality of the registered face images registered in the security inspection information DB 401a.

When the edge server 401 receives the target face image and matching request from the signage terminal 409, the edge server 401 performs matching of the face image of the user U (step S604). That is, the edge server 401 performs one-to-N matching between the target face image received from the signage terminal 409 and a plurality of the registered face images registered in the security inspection information DB 401*a*.

When the edge server 401 determines that a matching result is unsuccessful (step S605, NO), the edge server 401 transmits the matching result indicating the unsuccessful matching to the signage terminal 409 (step S608), and the process proceeds to step S609. On the other hand, when the edge server 401 determines that the matching result is successful (step S605, YES), the process proceeds to step S606.

In step S606, the edge server 401 acquires information including the inspection result of the baggage inspection and the storage location of the baggage. The information is associated with the registered face image that is matched in the security inspection information DB 401*a*. Then, the edge server 401 transmits the matching result, the inspection result of the baggage inspection, and the information of the storage location of the baggage to the signage terminal 409 (step S607). Thereafter, the process proceeds to step S609.

Next, when the signage terminal 409 determines, based on the information received from the edge server 401, that the baggage of the user U is stored in the storage box 410 (step S609, YES), the process proceeds to step S610.

On the other hand, when the signage terminal 409 determines that the baggage of the user U is not stored in the storage box 410 (step S609, NO), the signage terminal 409 notifies the user U of an error message (step S611). For example, a notification screen displays an error message such as "Your baggage is not kept."

In step S610, the signage terminal 409 displays a screen containing information on the storage location of the baggage of the user U, and ends the process.

Figure 20:
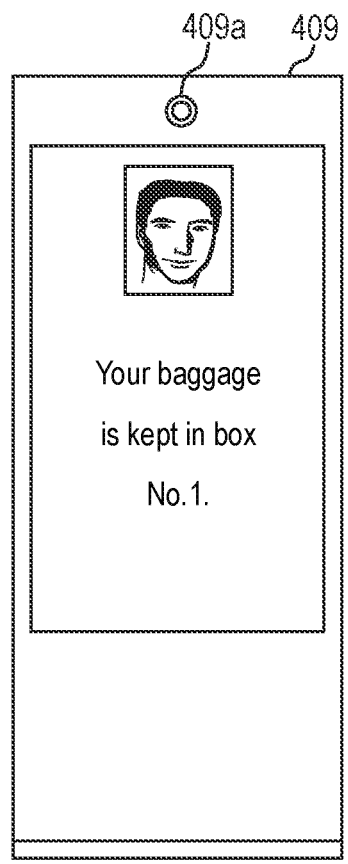
FIG. 20 is a diagram illustrating an example of a screen displayed on the signage terminal according to the first example embodiment.
Figure 21:
FIG. 21 is a diagram illustrating an example of a screen displayed on the signage terminal according to the first example embodiment.

FIGS. 20 and 21 are diagrams illustrating an example of a screen displayed on the signage terminal 409. In FIG. 20, the signage terminal 409 is provided with a camera 409*a* which is a biometric information acquisition device. When a matching result between the face image of the user U captured by the camera 409*a* and the captured face image stored in the security inspection information DB 401*a* is successful, the screen may include the face image of the user U and the guidance message "Your baggage is kept in box No. 1." as illustrated in FIG. 20. The message indicates the storage location of the baggage.

On the other hand, in FIG. 21, the matching result between the face image of the user U and the captured face image stored in the security inspection information DB 401*a* is successful, the screen may include a guidance message "The inspection of your baggage has not been completed yet. Please wait for a while until the inspection is completed.". The message indicates that the baggage inspection status of the user U is "not executed" or "being executed". Note that, when a target article is detected in the baggage inspection of the user U, a guidance screen for prompting the user U to wait may be displayed as FIG. 21.

<Delivery of Baggage>

Figure 22:
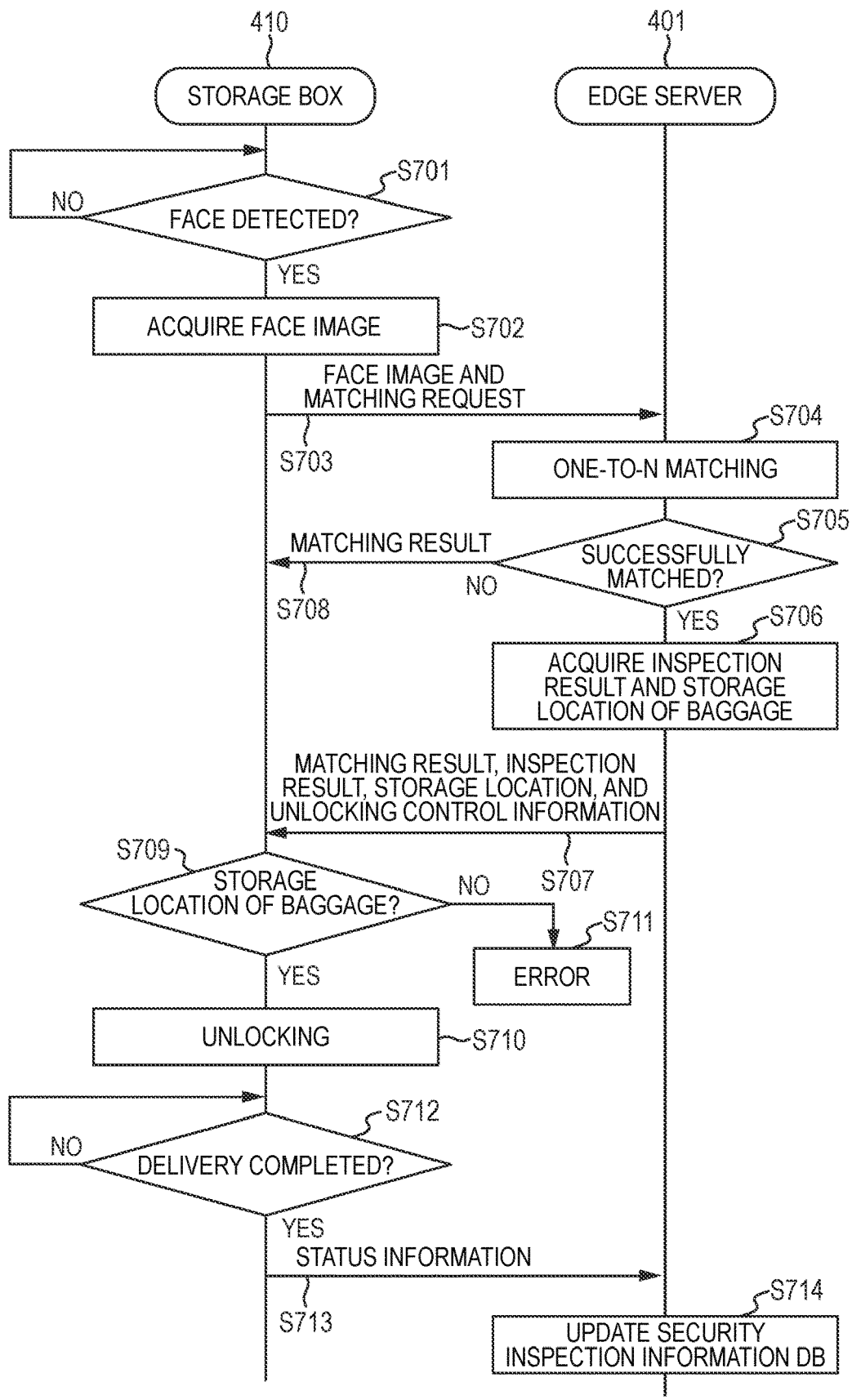
FIG. 22 is a sequence diagram illustrating an example of a process between the edge server and a storage box according to the first example embodiment.

FIG. 22 is a sequence diagram illustrating an example of process between the edge server 401 and the storage box 410. This process is performed for the user U who has completed both the body inspection and the baggage inspection.

The storage box 410 constantly or periodically captures an image front of the storage box 410, and determines whether or not the face of the user U standing in front of the storage box 410 has been detected in the captured image (step S701). The storage box 410 waits until the face of the user U is detected in the image (step S701, NO).

When storage box 410 determines that the face of the user U has been detected (step S701, YES), the storage box 410 captures the face of the user U and acquires the face image of the user U as a target face image (step S702).

Next, the storage box 410 transmits the target face image of the user U to the edge server 401 together with a matching request (step S703). Thus, the storage box 410 requests the edge server 401 to perform one-to-N matching between the target face image of the user U and a plurality of the registered face images registered in the security inspection information DB 401*a*.

When the edge server 401 receives the target face image and the matching request from the storage box 410, the edge server 401 performs matching of the face image of the user U (step S704). That is, the edge server 401 performs one-to-N matching between the target face image received from the storage box 410 and a plurality of the registered face images registered in the security inspection information DB 401*a*.

When the edge server 401 determines that the matching result is unsuccessful (step S705, NO), the edge server 401 transmits the matching result indicating the unsuccessful matching to the storage box 410 (step S708), and the process proceeds to step S709. On the other hand, when the edge server 401 determines that the matching result is successful (step S705, YES), the process proceeds to step S706.

In step S706, the edge server 401 acquires information including the inspection result of the baggage inspection and the storage location of the baggage. The information is associated with the registered face image that is matched in the security inspection information DB 401*a*. Then, the edge server 401 transmits the matching result, the baggage inspection result, information of the baggage storage location, unlocking control information, and the like to the storage box 410 (step S707). Thereafter, the process proceeds to step S709.

Next, when the storage box 410 determines, based on the received information, that the baggage of the user U is stored inside (step S709, YES), the door is unlocked based on the unlocking control information (step S710), and the process proceeds to step S712.

On the other hand, when the storage box determines that the baggage of the user U is not stored inside (step S709, NO), the storage box 410 notifies the user U of an error (step S711). For example, a notification screen includes an error message such as "Your baggage is not kept in this box." or "Your baggage is stored in box No. 3.".

Next, when the storage box 410 determines that the delivery of the stored baggage is completed (step S712, YES), the process proceeds to step S713.

On the other hand, when it is determined that the delivery of the baggage is not completed (step S712, NO), the storage box 410 waits until the delivery of the baggage is completed.

In step S713, the storage box 410 transmits status information indicating that the delivery of the baggage is completed to the edge server 401. When the edge server 401 receives the status information, the edge server 401 updates the delivery status of the user U in the security inspection information DB 401*a* to "delivery completion" (step S714), and ends the process.

Figure 23:
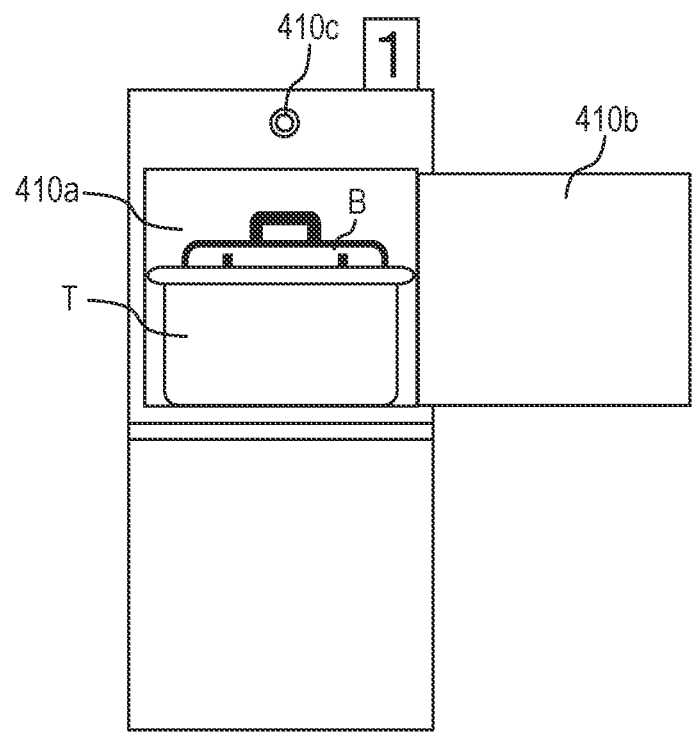
FIG. 23 is a front view illustrating an example of the configuration of the storage box according to the first example embodiment.

FIG. 23 is a front view illustrating an example of the configuration of the storage box 410. Here, the storage box 410 includes a space 410a in which the baggage B and the conveyance tray T can be stored, an openable/closable door 410b, and a camera 410c as a biometric information acquisition device. When the matching result between the face image of the user U captured by the camera 410c and the captured face image stored in the security inspection information DB 401a is successful, the edge server 401 outputs control information for unlocking the electronic lock (not illustrated) to the storage box 410. Thus, the user U can take back the baggage which has been deposited during the baggage inspection and the body inspection.

According to the present example embodiment, when the user U undergoes the baggage inspection, the biometric information of the user U is associated with the identification information of the baggage. As a result, the user U can freely deposit his/her own baggage for baggage inspection, and the user U can move to the body inspection area and undergo the body inspection. That is, by associating the user U with the baggage, the body inspection and the baggage inspection can be performed in parallel and in arbitrary order of the user U (owner). As a result, the throughput in the security inspection can be improved.

According to the present example embodiment, the biometric information of the user U and the identification information of the baggage are automatically acquired from one image captured at the moment when the user U deposits the baggage. When associating biometric information with the identification information of the baggage, the user U does not need to present a storage medium such as a passport or a boarding pass, thereby improving the convenience of the user U.

In addition, according to the present example embodiment, when a target article has been detected in one inspection of the baggage inspection and body inspection, the detection conditions of the target article in another inspection can be changed. By sharing the results of the two kinds of inspections, the detection accuracy of the target article can be further improved.

According to the present example embodiment, the edge server 401 determines the storage box 410 which is a storage location of the baggage based on the inspection result of the baggage inspection, and controls the conveyance of the baggage to the storage location by the baggage conveyance device 403. Since the baggage is automatically stored in the designated storage box 410, the workload of the staff S can be greatly reduced.

According to the present example embodiment, the edge server 401 causes the signage terminal 409 to display information on the storage location of the baggage when the target article is not detected in the baggage inspection and the body inspection. Therefore, for example, when the signage terminal 409 is disposed in the moving direction of the user U who has completed the body inspection, the user U can immediately know where his/her own baggage is stored.

According to the present example embodiment, the edge server 401 causes the signage terminal 409 to display the information of the storage location based on matching result between the biometric information of the user U and the biometric information included in the link information (security inspection information) acquired by the signage terminal 409. Thus, the user U can know where his/her own baggage is stored at a desired timing.

According to the present example embodiment, the edge server 401 controls the taking out of the baggage from the storage box 410 based on the matching result between the biometric information of the user U acquired in the storage box 410 and the biometric information included in the link information (security inspection information). Thus, since the baggage is delivered only to the owner of the baggage, it is possible to surely prevent from receiving the baggage by mistake.

Furthermore, according to the present example embodiment, the edge server 401 uses a learning model obtained by machine learning for baggage inspection and body inspection. Therefore, not only the already known target article (dangerous or suspicious objects) but also various kinds of target articles can be managed flexibly and quickly. As a result, the detection accuracy of the target article can be improved.

Second Example Embodiment

Figure 24:
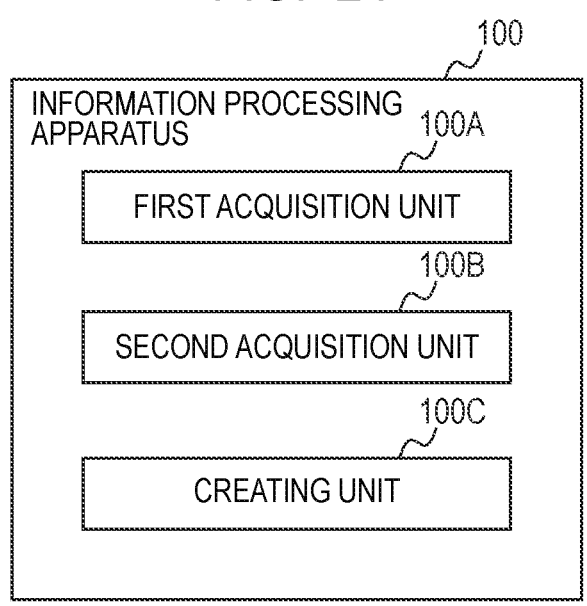
FIG. 24 is a block diagram illustrating an example of the overall configuration of an information processing apparatus according to a second example embodiment.

FIG. 24 is a block diagram illustrating an example of the overall configuration of the information processing apparatus 100 according to the present example embodiment. The information processing apparatus 100 includes a first acquisition unit 100A, a second acquisition unit 100B, and a creating unit 100C. The first acquisition unit 100A acquires biometric information of a person. The second acquisition unit 100B acquires identification information of the baggage possessed by the person. The creating unit 100C creates link information for associating the biometric information with the identification information. According to the present example embodiment, the relationship between baggage and its owner can be easily registered and managed.

Modified Example Embodiments

Although the disclosure has been described above with reference to the example embodiments, the disclosure is not limited to the example embodiments described above. Various modifications that may be understood by those skilled in the art can be made to the configuration and details of the disclosure within the scope not departing from the spirit of the disclosure. For example, it should be understood that an example embodiment in which a part of the configuration of any of the example embodiments is added to another example embodiment or an example embodiment in which a part of the configuration of any of the example embodiments is replaced with a part of another example embodiment is also one of the example embodiments to which the disclosure may be applied.

In the above-described embodiment, a case where a face image is used as the biometric information has been described, but the biometric information applicable to the present invention is not limited to the face image. For example, the management server 10 and the edge server 401 may perform the matching process using other biometric information such as a fingerprint image, an iris image, and an ear image instead of a face image. The management server 10 and the edge server 401 may perform the matching process based on the combination of different kinds of biometric information.

In the above-described embodiment, the case where the detection condition of the target article in one inspection of the baggage inspection and the body inspection is changed according to the result of another inspection has been described, but the detection condition of the target article may be changed based on other information. For example, the person attribute information of the user U may be used. As the person attribute information, at least one of a gender, an age, a nationality, history information of security inspection, history information of a travel destination, or the like can be used.

Specifically, it is preferable to set the detection threshold higher than the normal value for a person whose target article was detected in the security inspection performed in past travel. Similarly, the detection threshold may be raised in the case where the destination or the stopover place of the past travel of the user U is a predetermined country or region requiring attention.

In addition, when using travel history information (travel destination/stopover place/date and time/the number of times of travel within a predetermined period, etc.) or security inspection history information (inspection result/inspection date and time) as attribute information, the edge server 401 may input the history information into the learned model and calculate the creditworthiness and risks for each person. In this case, the edge server 401 (control unit) may raise the detection threshold value of the target article for a person determined to have low creditworthiness (high risk). Thus, for example, an unnatural point in the travel history of the user U can be automatically detected, and the accuracy of the security inspection can be further improved.

On the other hand, it is also possible to set the detection threshold in the security inspection lower than the normal value for excellent travelers who have no problems in their past travel history. In particular, in the case of a system configuration in which the person attribute information can be easily acquired based on the biometric information of the user U, there is an advantage that an optimum security inspection can be performed for each user U. When the user U is a blacklisted person, the user U may be determined as an error without performing the inspection, and may be subjected to a detailed inspection at another place.

In the above-described embodiment has been described with respect to the case where the determination threshold value for the captured image or the measurement signal is changed, but the capturing condition of the image or the measurement condition of the signal may be changed. For example, when the baggage inspection device 405 is a three-dimensional CT scanner, it may be configured to inspect in more detail than usual by changing the angle of capturing and the interval of capturing positions.

In the above-described embodiment, the case where one baggage inspection device 405 is arranged is exemplified, but the number of baggage inspection devices 405 is not limited. For example, the baggage inspection devices 405 may be arranged so as to simultaneously inspect a plurality of pieces of baggage. This is also true of the body inspection device 406 (e.g., a metal detector or a millimeter wave scanner).

In the above-described embodiment, the case where the baggage of the user U is stored in the storage box 410 for each person has been described, but the storage method is not limited thereto. For example, baggage of a plurality of users U may be stored in each lane. In this case, it is preferable to provide other surveillance means for preventing mix-ups of baggage. When the baggage of a plurality of users U is stored in each lane, it is preferable to display in which lane the baggage is stored on the signage terminal 409 or the like. As a result, the limited space in the security inspection site can be effectively utilized, and therefore, the throughput in the security inspection site can be improved.

In the above-described embodiment, the case where the baggage of the user U is stored in the security inspection area has been described, but the storage area may not necessarily be the security inspection area. For example, it may be configured to store in a dedicated locker provided in the departure area.

In the above-described embodiment, a case has been described in which a barcode acquired from a conveyance tray storing baggage is used as the baggage identification information among the captured images, but the method of acquiring the baggage identification information is not limited to reading the barcode. For example, characters or figures printed or shaped on the surface of the conveyance tray may be read and used as the identification information of the baggage. The feature amount of the baggage may be calculated and used as the identification information of the baggage. Further, it may be read from a recording medium built in the conveyance tray. Similarly, as the identification information of the user U, information read from a recording medium such as a passport, a boarding pass, or various identification documents can be used instead of the biometric information of the user U.

In the above-described embodiment, a security inspection site of an airport facility has been described as an example, but the facility to which the present invention can be applied is not limited thereto. For example, it is also applicable to security inspection procedures prior to entry at concert venues, theme parks, high-speed railways, ships, etc.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments also includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

Supplementary Note 1

An information processing apparatus comprising:
a first acquisition unit that acquires biometric information of a person;
a second acquisition unit that acquires identification information of the baggage possessed by the person; and
a creating unit that creates link information for associating the biometric information with the identification information.

Supplementary Note 2

The information processing apparatus according to supplementary note 1, further comprising:
a control unit that executes in parallel based on the link information, a baggage inspection for determining whether or not a target article restricted from being carried into a restricted area is included in the baggage and a body inspection for determining whether or not the target article is possessed by the person.

Supplementary Note 3

The information processing apparatus according to supplementary note 2, wherein the control unit changes, based on a result of one inspection of the baggage inspection and the body inspection, detection conditions of the target article in another inspection.

Supplementary Note 4

The information processing apparatus according to supplementary note 3, wherein when the target article is detected in the one inspection of the baggage inspection and the body inspection, the control unit restricts the detection conditions of the target article in another inspection than the currently set conditions.

Supplementary Note 5

The information processing apparatus according to any one of supplementary notes 2 to 4, further comprising:
an acquisition unit that acquires attribute information by matching process of the registered biometric information and the biometric information preliminarily associated with the attribute information of the person,
wherein the control unit changes detection conditions of the target article in each of the baggage inspection and the body inspection based on the attribute information.

Supplementary Note 6

The information processing apparatus according to supplementary note 5, wherein the attribute information includes at least one of a gender, an age, and nationality of the person.

Supplementary Note 7

The information processing apparatus according to supplementary note 5 or 6, wherein the attribute information includes inspection history information of the body inspection and the baggage inspection that were performed.

Supplementary Note 8

The information processing apparatus according to supplementary note 7, wherein when the inspection history information indicating that the target article was detected in the past is acquired, the control unit restricts the detection conditions of the target article than the currently set conditions.

Supplementary Note 9

The information processing apparatus according to any one of supplementary notes 5 to 8, wherein the attribute information includes travel history information of the person.

Supplementary Note 10

The information processing apparatus according to any one of supplementary notes 2 to 9, wherein the control unit determines a storage location of the baggage based on a result of the baggage inspection and controls the conveyance of the baggage to the storage location.

Supplementary Note 11

The information processing apparatus according to supplementary note 10, wherein when the target article is not detected in the baggage inspection and the body inspection, the control unit causes a display terminal to display information regarding the storage location of the baggage.

Supplementary Note 12

The information processing apparatus according to supplementary note 11, wherein the control unit causes the display terminal to display information regarding the storage location based on a result of matching between a second biometric information of the person acquired by the display terminal and the biometric information included in the link information.

Supplementary Note 13

The information processing apparatus according to any one of supplementary notes 10 to 12, wherein the control unit controls the ejecting of the baggage from a storage device based on a result of matching between a third biometric information of the person acquired in a storage device at the storage location and the biometric information included in the link information.

Supplementary Note 14

The information processing apparatus according to any one of supplementary notes 2 to 13, wherein when the target article is detected in the body inspection or the baggage inspection, the control unit outputs detection information of the target article to a predetermined operation terminal.

Supplementary Note 15

The information processing apparatus according to any one of supplementary notes 2 to 14, further comprising:
a baggage inspection unit that executes the baggage inspection based on a learning model that previously learned the relationship between an image capturing the baggage and feature information regarding the target article.

Supplementary Note 16

The information processing apparatus according to any one of supplementary notes 2 to 14, further comprising:
a body inspection unit that executes the body inspection based on a learning model that previously learned the relationship between an image capturing a body of the person and feature information regarding the target article.

Supplementary Note 17

The information processing apparatus according to any one of supplementary notes 1 to 16, wherein the biometric information and the identification information are acquired from a captured image in which the person and the baggage are shown.

Supplementary Note 18

The information processing apparatus according to supplementary note 17, the identification information is any of a character, a graphic, or a barcode acquired from the captured image of a container storing the baggage.

Supplementary Note 19

The information processing apparatus according to supplementary note 17, wherein the identification information is a feature amount acquired from the captured image of the baggage.

Supplementary Note 20

An information processing method comprising:
acquiring biometric information of a person;
acquiring identification information of the baggage possessed by the person; and
creating link information for associating the biometric information with the identification information.

Supplementary Note 21

A storage medium storing a program that causes a computer to perform:
acquiring biometric information of a person;
acquiring identification information of the baggage possessed by the person; and
creating link information for associating the biometric information with the identification information.

What is claimed is:

1. An information processing apparatus comprising:
at least one memory storing instructions; and
at least one processor configured to execute the instructions to:
determine a creditworthiness of a person based on attribute information of the person;
associate between biometric information of the person, identification information of baggage possessed by the person, and the creditworthiness, the biometric information of the person and the identification information of the baggage being simultaneously acquired from one captured image; and
change a threshold for a body inspection of the person based on the creditworthiness and a result of a baggage inspection of the baggage completed earlier than the body inspection,
wherein the identification information of the baggage is identification information of a tray in which the baggage is stored at the time of baggage inspection, and
wherein the body inspection comprises scanning the person by a millimeter wave scanner, determining, by an edge server, whether a target article is included in the body of the person based on a result of scanning the person by the millimeter wave scanner, and controlling a display to output a result of determining whether the target article is included in the body of the person.

2. The information processing apparatus according to claim 1, wherein the at least one processor is further configured to execute the instructions to implement, in parallel based on the link information, a baggage inspection for determining whether or not a target article restricted from being carried into a restricted area is included in the baggage and a body inspection for determining whether or not the target article is possessed by the person.

3. The information processing apparatus according to claim 2, wherein the at least one processor is further configured to execute the instructions to implement changing, based on a result of one inspection of the baggage inspection and the body inspection, detection conditions of the target article in another inspection.

4. The information processing apparatus according to claim 3, wherein the at least one processor is further configured to execute the instructions to implement, when the target article is detected in the one inspection of the baggage inspection and the body inspection, setting the threshold for the security inspection of the target article in the another inspection higher than a currently set value.

5. The information processing apparatus according to claim 2, wherein the at least one processor is further configured to execute the instructions to implement:
acquiring attribute information by matching process of the registered biometric information and the biometric information preliminarily associated with the attribute information of the person; and
changing detection conditions of the target article in each of the baggage inspection and the body inspection based on the attribute information.

6. The information processing apparatus according to claim 5, wherein the attribute information includes at least one of a gender, an age, and nationality of the person.

7. The information processing apparatus according to claim 5, wherein the attribute information includes inspection history information of the body inspection and the baggage inspection that were performed.

8. The information processing apparatus according to claim 7, wherein the at least one processor is further configured to execute the instructions to implement, when the inspection history information indicating that the target article was detected in the past is acquired, setting the threshold for the security inspection of the target article higher than a currently set value.

9. The information processing apparatus according to claim 5, wherein the attribute information includes travel history information of the person.

10. The information processing apparatus according to claim 2, wherein the at least one processor is further configured to execute the instructions to implement determining a storage location of the baggage based on a result of the baggage inspection and controls the conveyance of the baggage to the storage location.

11. The information processing apparatus according to claim 10, wherein the at least one processor is further configured to execute the instructions to implement, when the target article is not detected in the baggage inspection and the body inspection, causing a display terminal to display information regarding the storage location of the baggage.

12. The information processing apparatus according to claim 11, wherein the at least one processor is further configured to execute the instructions to implement causing the display terminal to display information regarding the storage location based on a result of matching between a second biometric information of the person acquired by the display terminal and the biometric information included in the link information.

13. The information processing apparatus according to claim 10, wherein the at least one processor is further configured to execute the instructions to implement controlling an ejecting of the baggage from a storage device based on a result of matching between a third biometric information of the person acquired in a storage device at the storage location and the biometric information included in the link information.

14. The information processing apparatus according to claim 2, wherein the at least one processor is further configured to execute the instructions to implement, when the target article is detected in the body inspection or the baggage inspection, outputting detection information of the target article to a predetermined operation terminal.

15. The information processing apparatus according to claim 2, wherein the at least one processor is further configured to execute the instructions to implement the baggage inspection based on a learning model that previously learned the relationship between an image capturing the baggage and feature information regarding the target article.

16. The information processing apparatus according to claim 2, wherein the at least one processor is further configured to execute the instructions to implement the body inspection based on a learning model that previously learned the relationship between an image capturing a body of the person and feature information regarding the target article.

17. The information processing apparatus according to claim 1, wherein the biometric information and the identification information are acquired from a captured image in which the person and the baggage are shown.

18. The information processing apparatus according to claim 17, the identification information is any of a character, a graphic, or a barcode acquired from the captured image of a container storing the baggage.

19. An information processing method comprising:
determining a creditworthiness of a person based on attribute information of the person;
associating between biometric information of the person, identification information of baggage possessed by the person, and the creditworthiness, the biometric information of the person and the identification information of the baggage being simultaneously acquired from one captured image; and
changing a threshold for a body inspection of the person based on the creditworthiness and a result of a baggage inspection of the baggage completed earlier than the body inspection,
wherein the identification information of the baggage is identification information of a tray in which the baggage is stored at the time of baggage inspection, and
wherein the body inspection comprises scanning the person by a millimeter wave scanner, determining, by an edge server, whether a target article is included in the body of the person based on a result of scanning the person by the millimeter wave scanner, and controlling a display to output a result of determining whether the target article is included in the body of the person.

20. A non-transitory storage medium storing a program that causes a computer to perform:
determining a creditworthiness of a person based on attribute information of the person;
associating between biometric information of the person, identification information of baggage possessed by the person, and the creditworthiness, the biometric information of the person and the identification information of the baggage being simultaneously acquired from one captured; and
changing a threshold for a body inspection of the person based on the creditworthiness and a result of a baggage inspection of the baggage completed earlier than the body inspection,
wherein the identification information of the baggage is identification information of a tray in which the baggage is stored at the time of baggage inspection, and
wherein the body inspection comprises scanning the person by a millimeter wave scanner, determining, by an edge server, whether a target article is included in the body of the person based on a result of scanning the person by the millimeter wave scanner, and controlling a display to output a result of determining whether the target article is included in the body of the person.

* * * * *